(12) United States Patent
Schowengerdt et al.

(10) Patent No.: US 10,176,639 B2
(45) Date of Patent: Jan. 8, 2019

(54) VIRTUAL/AUGMENTED REALITY SYSTEM HAVING DYNAMIC REGION RESOLUTION

(71) Applicant: MAGIC LEAP, INC., Dania Beach, FL (US)

(72) Inventors: Brian T. Schowengerdt, Seattle, WA (US); Lionel Ernest Edwin, Hollywood, FL (US); Ivan L. Yeoh, Fort Lauderdale, FL (US); Aaron Mark Schuelke, Coral Springs, FL (US); Samuel A. Miller, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/212,053

(22) Filed: Jul. 15, 2016

(65) Prior Publication Data
US 2016/0328884 A1 Nov. 10, 2016

Related U.S. Application Data

(63) Continuation-in-part of application No. 14/555,585, filed on Nov. 27, 2014, now Pat. No. 9,791,700.
(Continued)

(51) Int. Cl.
*G09G 5/00* (2006.01)
*G06T 19/00* (2011.01)
(Continued)

(52) U.S. Cl.
CPC .............. *G06T 19/006* (2013.01); *G02B 6/00* (2013.01); *G02B 6/02042* (2013.01); *G02B 6/06* (2013.01); *G02B 6/32* (2013.01); *G02B 6/34* (2013.01); *G02B 6/40* (2013.01); *G02B 17/08* (2013.01); *G02B 27/0093* (2013.01); *G02B 27/017* (2013.01); *G02B 27/0172* (2013.01); *G06F 3/011* (2013.01); *G06F 3/013* (2013.01); *G06F 3/14* (2013.01); *G06T 3/0093* (2013.01);
(Continued)

(58) Field of Classification Search
CPC .... G06T 19/006; G02B 6/00; G02B 6/02042; G02B 6/06; G02B 6/32; G02B 6/34; G02B 6/40; G02B 17/08; G02B 27/0093; G02B 27/017; G02B 27/0172; G02F 1/0105; G02F 1/1334; G02F 1/17; G02F 1/29; G06F 3/011; G06F 3/013
USPC ......................................... 345/619, 632, 633
See application file for complete search history.

(56) References Cited

U.S. PATENT DOCUMENTS 3,959,583 A * 5/1976 Judice ...................... H04N 5/70
                                                       327/76
5,103,306 A * 4/1992 Weiman .................. G01S 5/163
                                                       348/400.1
(Continued)

OTHER PUBLICATIONS

PCT International Search Report and Written Opinion for International Appln. No. PCT/US16/42649, Applicant Magic Leap, Inc., forms PCT/ISA/210, 220, and 237, dated Oct. 4, 2016 (11 pages).
(Continued)

*Primary Examiner* — Sarah Lhymn
(74) *Attorney, Agent, or Firm* — Vista IP Law Group LLP

(57) ABSTRACT

A virtual image generation system and method is provided. A plurality of synthetic image frames of the three-dimensional scene are rendered, and sequentially displayed to an end user. Each of the displayed image frames has a non-uniform resolution distribution.

19 Claims, 27 Drawing Sheets

Related U.S. Application Data

(60) Provisional application No. 62/194,113, filed on Jul. 17, 2015.

(51) Int. Cl.

| | | |
|---|---|---|
| *G06T 3/40* | (2006.01) | |
| *G06T 3/00* | (2006.01) | |
| *G02B 27/01* | (2006.01) | |
| *G02B 6/32* | (2006.01) | |
| *G02B 6/34* | (2006.01) | |
| *G02B 6/40* | (2006.01) | |
| *G02B 17/08* | (2006.01) | |
| *G02B 6/00* | (2006.01) | |
| *G02B 6/02* | (2006.01) | |
| *G02B 6/06* | (2006.01) | |
| *G06F 3/01* | (2006.01) | |
| *H04N 5/74* | (2006.01) | |
| *G02B 27/00* | (2006.01) | |
| *H04N 5/225* | (2006.01) | |
| *G06F 3/14* | (2006.01) | |
| *G09G 3/02* | (2006.01) | |
| *H04N 13/344* | (2018.01) | |
| *H04N 13/383* | (2018.01) | |
| *H04N 13/398* | (2018.01) | |

(52) U.S. Cl.
CPC ............ *G06T 3/40* (2013.01); *G09G 3/025* (2013.01); *G09G 5/00* (2013.01); *H04N 5/2258* (2013.01); *H04N 5/74* (2013.01); *H04N 13/344* (2018.05); *H04N 13/383* (2018.05); *H04N 13/398* (2018.05); *G02B 2006/0098* (2013.01); *G02B 2027/014* (2013.01); *G02B 2027/0134* (2013.01); *G02B 2027/0138* (2013.01); *G02B 2027/0147* (2013.01); *G02B 2027/0178* (2013.01); *G02B 2027/0187* (2013.01); *G09G 2340/0407* (2013.01); *G09G 2340/14* (2013.01); *G09G 2350/00* (2013.01); *G09G 2354/00* (2013.01)

(56) References Cited

U.S. PATENT DOCUMENTS

| | | | |
|---|---|---|---|
| 5,668,588 A * | 9/1997 | Morizumi | B41J 2/45 347/169 |
| 5,872,572 A | 2/1999 | Rossignac | |
| 6,477,553 B1 | 11/2002 | Druck | |
| 6,734,916 B1 * | 5/2004 | Sims | H04N 7/012 348/451 |
| 7,439,940 B1 | 10/2008 | Maguire, Jr. | |
| 9,417,452 B2 | 8/2016 | Schowengerdt et al. | |
| 2002/0180756 A1 | 12/2002 | Lee et al. | |
| 2003/0026588 A1 | 2/2003 | Elder et al. | |
| 2004/0227703 A1 * | 11/2004 | Lamvik | G02B 27/0172 345/76 |
| 2005/0046944 A1 * | 3/2005 | Shenderova | G02B 5/1842 359/565 |
| 2008/0219493 A1 * | 9/2008 | Tadmor | G06T 1/00 382/100 |
| 2011/0298789 A1 * | 12/2011 | Ko | H04N 13/0025 345/419 |
| 2012/0154277 A1 * | 6/2012 | Bar-Zeev | G02B 27/017 345/158 |
| 2013/0314793 A1 * | 11/2013 | Robbins | G02B 5/18 359/573 |
| 2014/0247277 A1 | 9/2014 | Guenter et al. | |
| 2014/0253437 A1 * | 9/2014 | Vaught | G02B 27/017 345/156 |
| 2014/0267420 A1 | 9/2014 | Schowengerdt et al. | |
| 2014/0268359 A1 | 9/2014 | Yuki et al. | |
| 2014/0306866 A1 | 10/2014 | Miller et al. | |
| 2015/0015845 A1 * | 1/2015 | Spaide | G01B 9/02091 351/206 |
| 2015/0016777 A1 | 1/2015 | Abovitz et al. | |
| 2015/0178939 A1 | 6/2015 | Bradski et al. | |
| 2015/0264299 A1 * | 9/2015 | Leech | H04N 7/0117 348/78 |
| 2015/0346495 A1 | 12/2015 | Welch et al. | |

OTHER PUBLICATIONS

Extended EP Search Report dated Jul. 10, 2018 for EP application No. 16828334.9, 11 pages.

Guowei Xue et al, "Architecture Exploration and Performance Analysis of Hardware Backprojector At Transaction Level", 2010 $2^{ND}$ International Conference on Signal Processing Systems (ICSPS), IEEE, dated Jul. 5, 2010, 5 pages.

Ken Museth et al., "Level Set Segmentaton From Multiple Non-Uniform Volume Dataset", VIS 2002. IEE Visualization Oct. 27, 2002-Nov. 1, 2002. Boston MA. dated Oct. 27, 2002.

\* cited by examiner

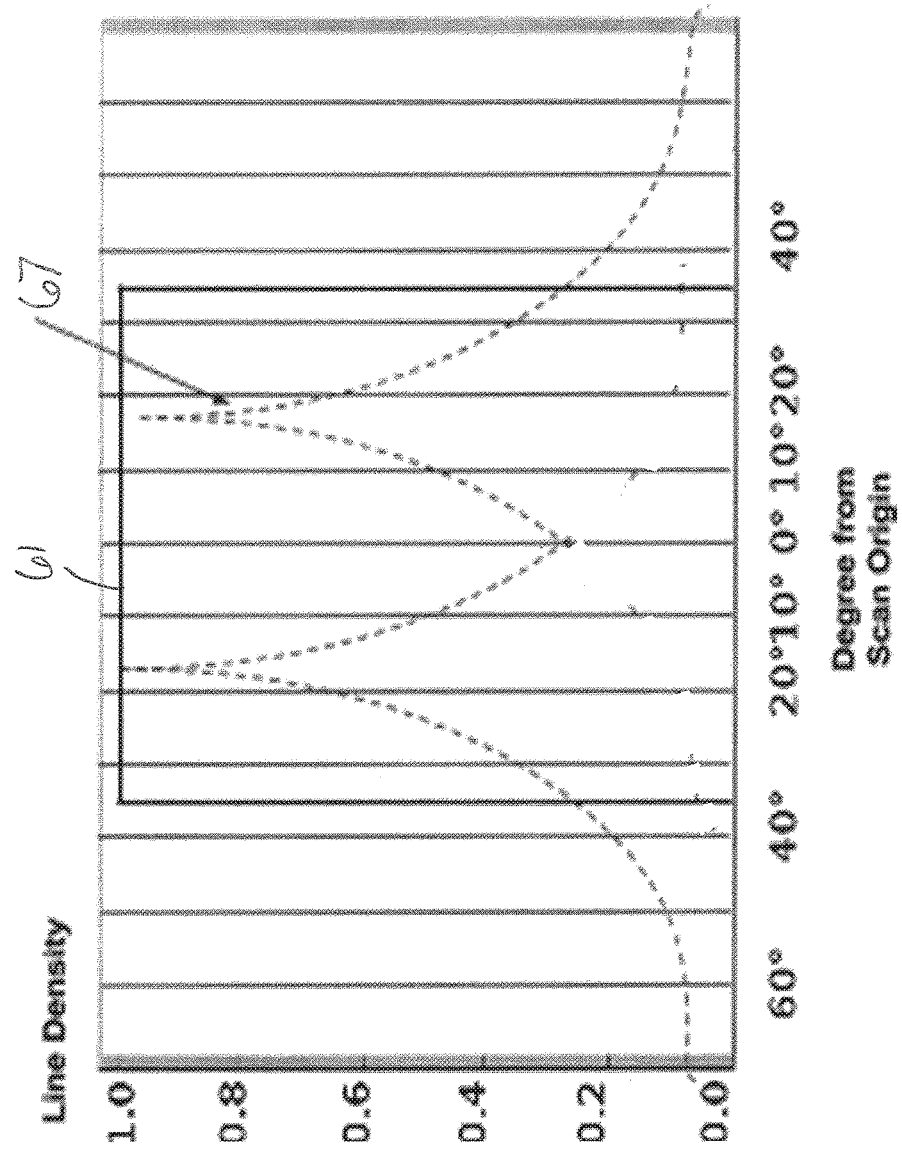

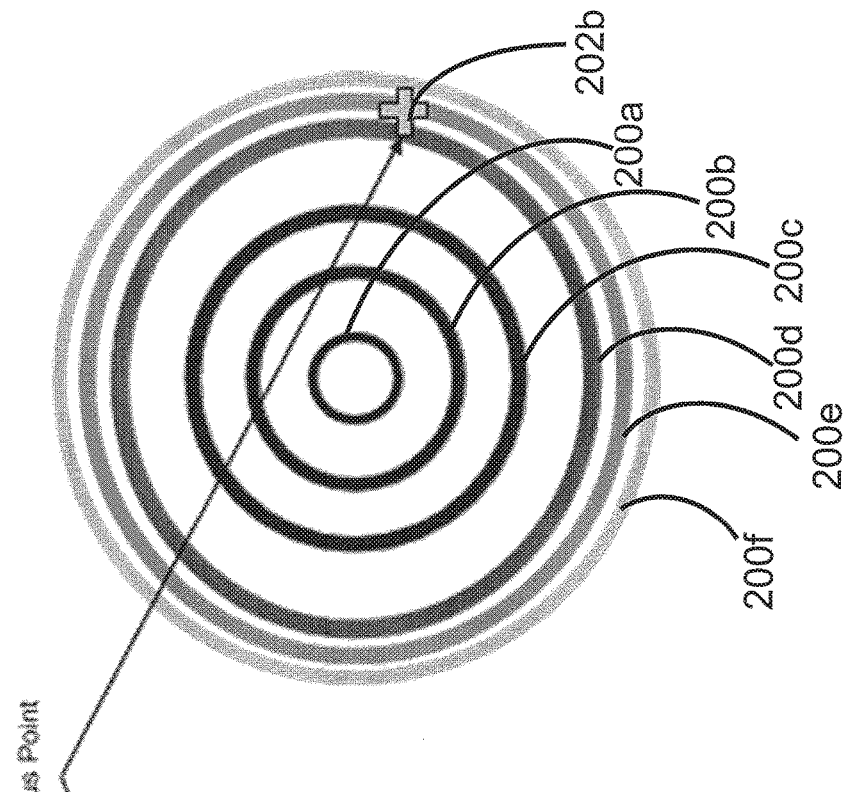
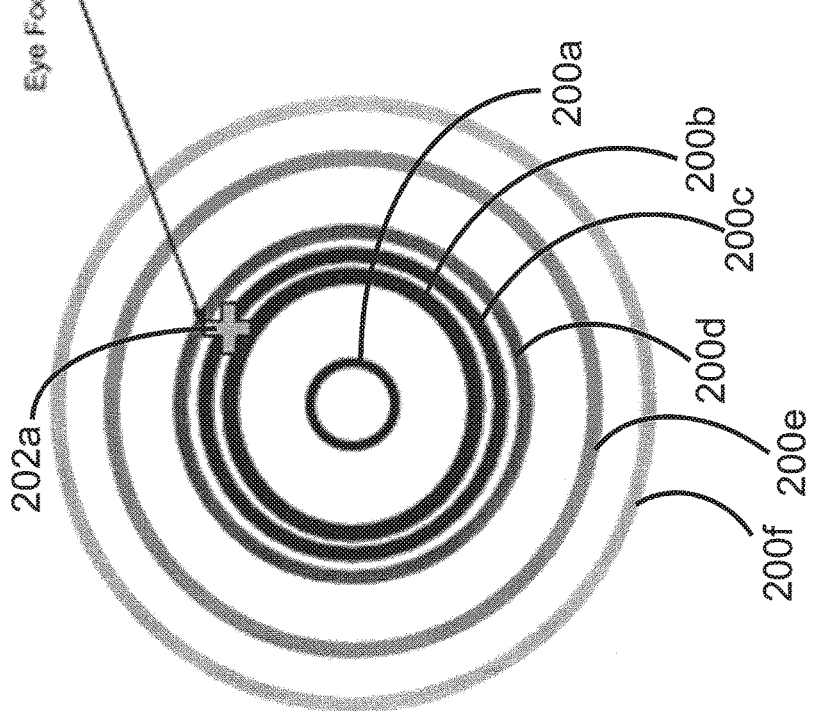

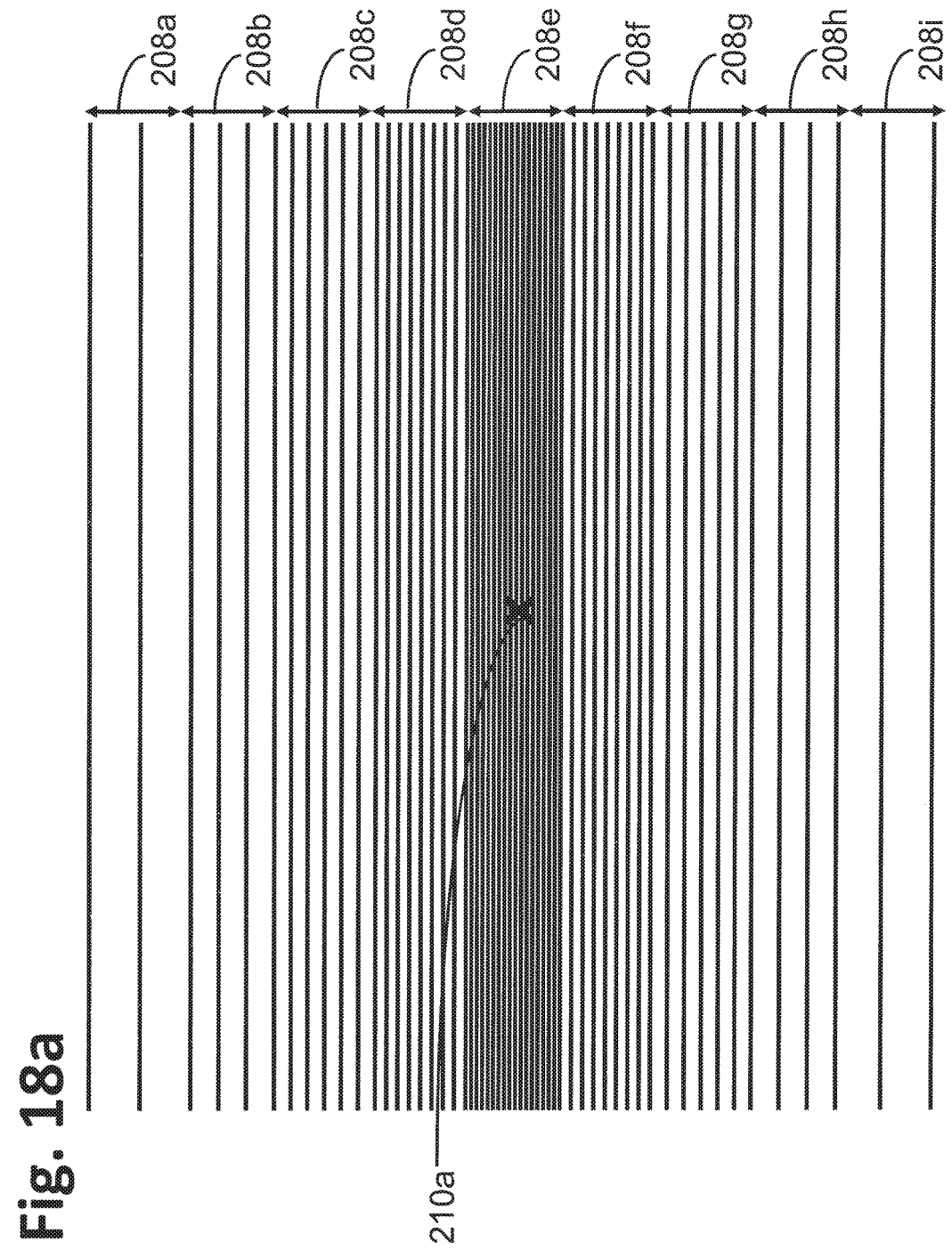

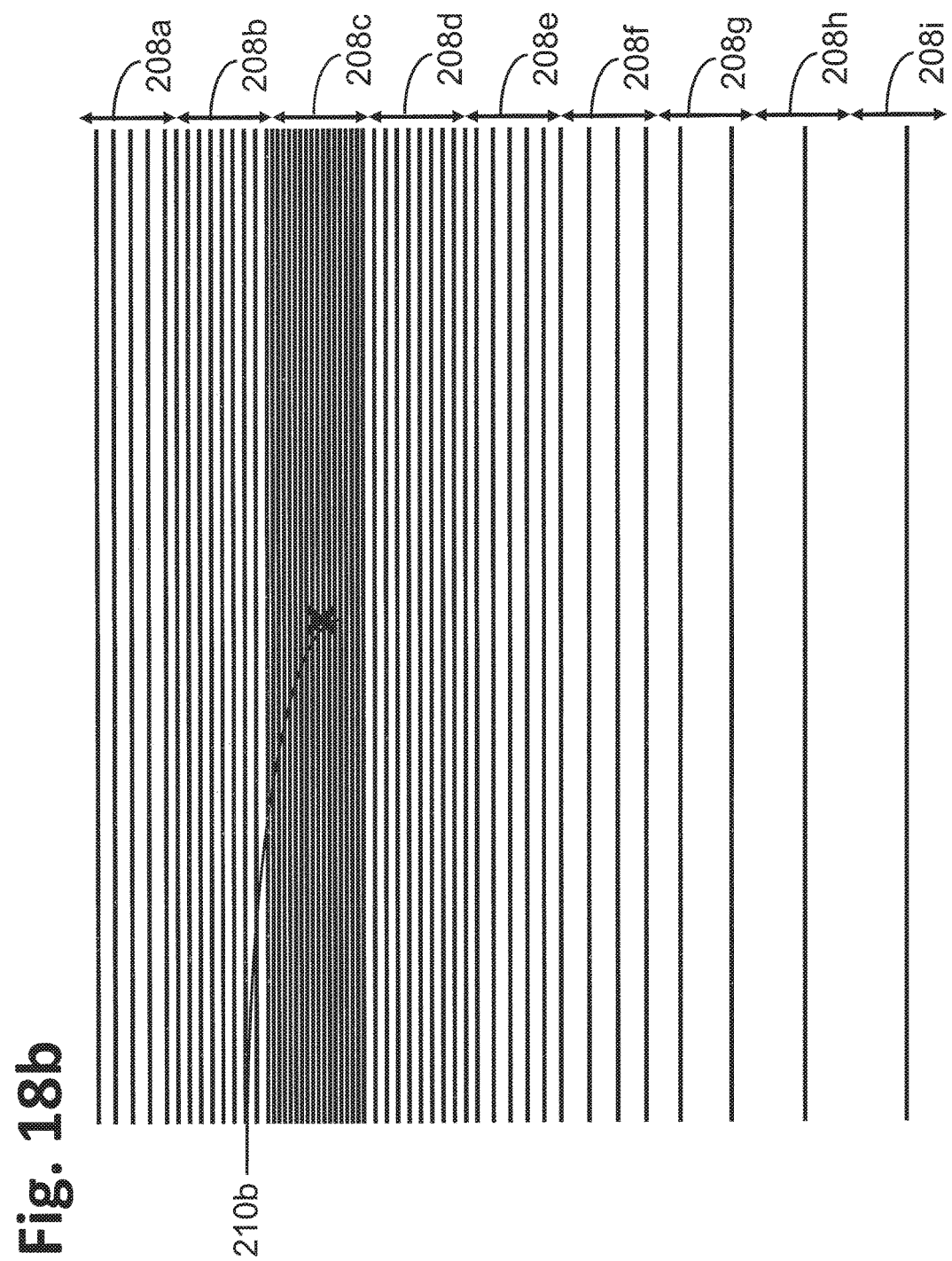

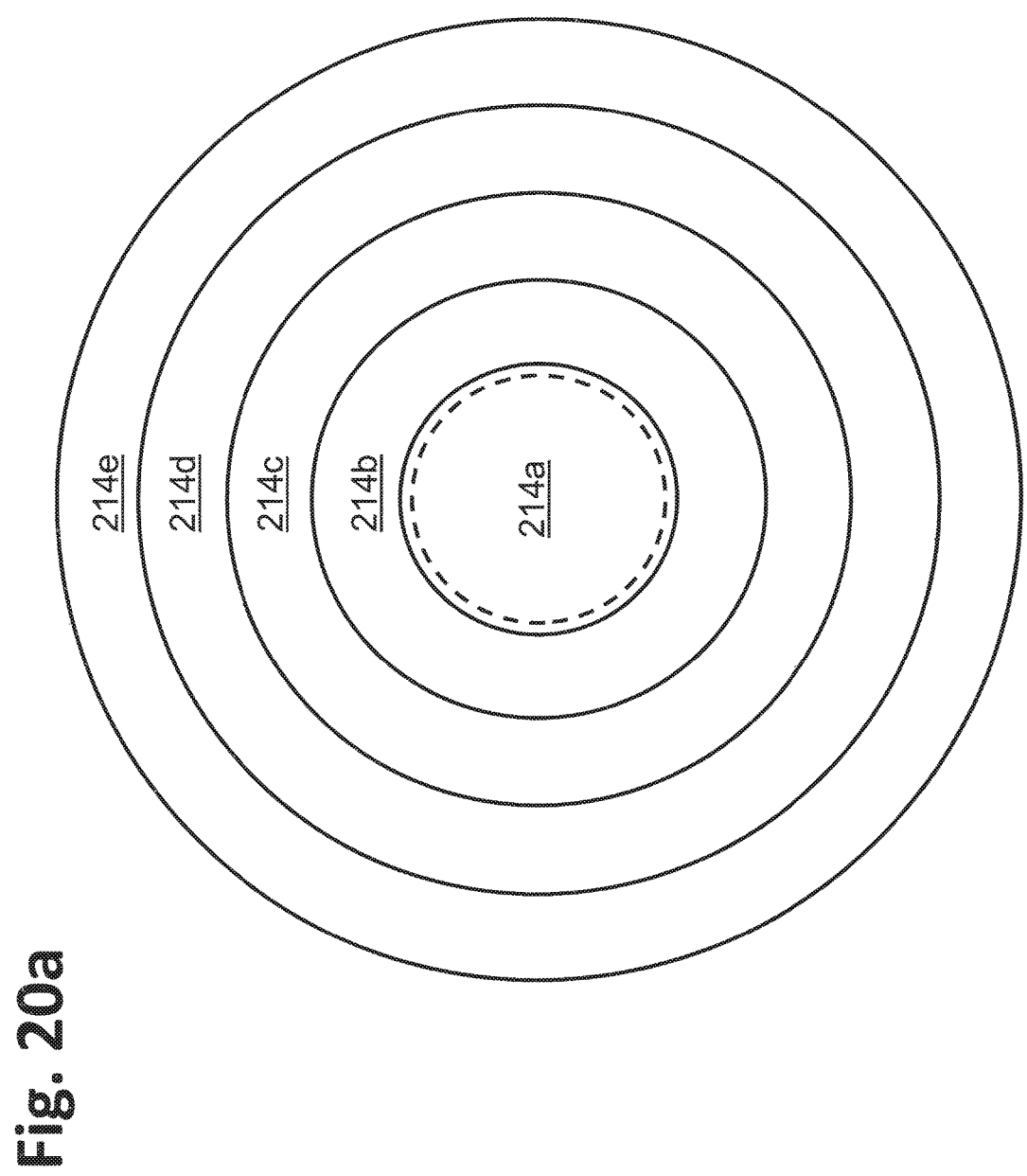

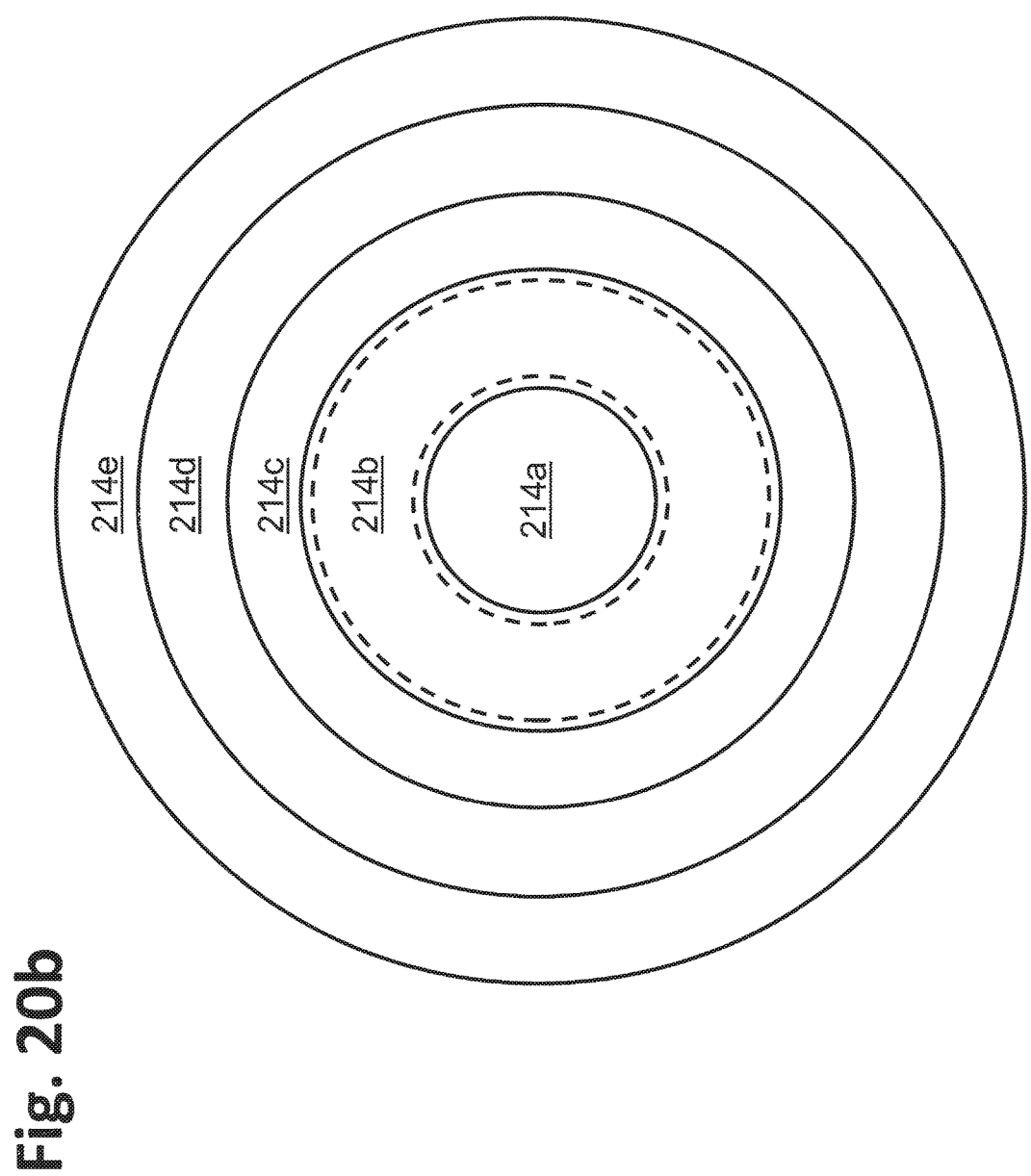

VIRTUAL/AUGMENTED REALITY SYSTEM HAVING DYNAMIC REGION RESOLUTION

CROSS-REFERENCE TO RELATED APPLICATION

This application is a continuation-in-part of U.S. patent application Ser. No. 14/555,585, filed on Nov. 27, 2014 entitled "VIRTUAL AND AUGMENTED REALITY SYSTEMS AND METHODS," and claims priority to U.S. Provisional Application Ser. No. 62/194,113 filed on Jul. 17, 2015 entitled "VIRTUAL/AUGMENTED REALITY SYSTEM HAVING DYNAMIC REGION RESOLUTION,". The contents of the aforementioned patent applications are hereby expressly incorporated by reference in its entirety for all purposes as though set forth in full.

FIELD OF THE INVENTION

The present invention generally relates to systems and methods configured to facilitate interactive virtual or augmented reality environments for one or more users.

BACKGROUND

Modern computing and display technologies have facilitated the development of systems for so-called "virtual reality" or "augmented reality" experiences, wherein digitally reproduced images or portions thereof are presented to a user in a manner where they seem to be, or may be perceived as, real. A virtual reality (VR) scenario typically involves presentation of digital or virtual image information without transparency to other actual real-world visual input, whereas an augmented reality (AR) scenario typically involves presentation of digital or virtual image information as an augmentation to visualization of the actual world around the end user.

For example, referring to FIG. 1, an augmented reality scene 4 is depicted wherein a user of an AR technology sees a real-world park-like setting 6 featuring people, trees, buildings in the background, and a concrete platform 8. In addition to these items, the end user of the AR technology also perceives that he "sees" a robot statue 10 standing upon the real-world platform 8, and a cartoon-like avatar character 12 flying by which seems to be a personification of a bumble bee, even though these elements 10, 12 do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

VR and AR systems typically employ head-worn displays (or helmet-mounted displays, or smart glasses) that are at least loosely coupled to a user's head, and thus move when the end user's head moves. If the end user's head motions are detected by the display system, the data being displayed can be updated to take the change in head pose (i.e., the orientation and/or location of user's head) into account.

As an example, if a user wearing a head-worn display views a virtual representation of a three-dimensional (3D) object on the display and walks around the area where the 3D object appears, that 3D object can be re-rendered for each viewpoint, giving the end user the perception that he or she is walking around an object that occupies real space. If the head-worn display is used to present multiple objects within a virtual space (for instance, a rich virtual world), measurements of head pose can be used to re-render the scene to match the end user's dynamically changing head location and orientation and provide an increased sense of immersion in the virtual space.

Head-worn displays that enable AR (i.e., the concurrent viewing of real and virtual elements) can have several different types of configurations. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the end user can see through transparent (or semi-transparent) elements in the display system to view directly the light from real objects in the environment. The transparent element, often referred to as a "combiner," superimposes light from the display over the end user's view of the real world.

VR and AR systems typically employ a display system having a projection subsystem and a display surface positioned in front of the end user's field of view and on which the projection subsystem sequentially projects image frames. In true three-dimensional systems, the depth of the display surface can be controlled at frame rates or sub-frame rates. The projection subsystem may include one or more optical fibers into which light from one or more light sources emit light of different colors in defined patterns, and a scanning device that scans the optical fiber(s) in a predetermined pattern to create the image frames that sequentially displayed to the end user.

Because a VR or AR system interfaces closely with the human visual system, the resolution of each image frame need only match the resolution of the human eye to provide the correct visual stimulus. To this end, the resolution of the each image frame is typically set to the maximum resolution of the human eye. However, because the scanning frequency of any particular system is a function of the image frame resolution due to both software and hardware limitations (i.e., the frequency at the respective image frames are graphically rendered (software) and actually presented to the end user via the scanner (hardware)), attempting to match the image frame resolution to the maximum resolution of the human eye adds constraints to the AR and VR system that may either result in scanning frequencies that may not optimize the viewing experience of the end user and/or require prohibitively more expensive componentry of the AR or VR system necessary to implement the increased processing and scanning speed required to generate and present the higher resolution image frames.

There, thus, is a need to reduce the overall resolution and/or hardware/software processing cost of an image frame generated and present to an end user in a virtual reality or augmented reality environment.

SUMMARY

Embodiments of the present invention are directed to devices, systems and methods for facilitating virtual reality and/or augmented reality interaction for one or more users.

In accordance with one aspect of the present inventions, a method of operating a virtual image generation system is provided. The method comprises rendering a plurality of synthetic image frames of a three-dimensional scene, and sequentially displaying the plurality of image frames to the end user Significantly, each of the displayed image frames has a non-uniform resolution distribution. In one method, each of the image frames is rendered with the non-uniform resolution distribution. In another method, each of the displayed image frames is rendered with a uniform resolution distribution, in which case, displaying the respective image frame comprises incorporating the non-uniform resolution distribution into the already rendered image frame. The resolution distribution of each of the displayed image frames may have a slope that matches or is even greater than the slope of an acuity distribution of an eye of the end user. The respective image frame may be displayed by scanning the image frame, e.g., in a spiral pattern, such that the non-uniform resolution distribution radially varies, or in a raster pattern, such that the non-uniform resolution distribution varies rectilinearly.

In one method, at least two of the displayed image frames have different non-uniform resolution distribution. In another method, each of the displayed image frames has a plurality of discrete regions (e.g., at least three) having different resolutions. The discrete regions, may be, e.g., annular, rectangular, or sector-shaped. In still another method, the plurality of discrete regions includes a region of highest resolution, in which case, the method may further comprise selecting the region of highest resolution from a field of view template having a plurality of discrete regions, which may overlap each other. In an optional embodiment, the plurality of discrete region may include a region of highest resolution and a region of lower resolution, in which case, the method may further comprise blurring the displayed image frames in the region of lower resolution. The displayed image frames may be blurred, e.g., by dithering scan line in adjacent displayed image frames in the region of lower resolution or by defocusing the displayed image frames in the region of lower resolution.

An optional method comprises estimating a focal point of an eye within a field of view of the end user (e.g., by detecting the focal point of the end user or identifying an object of interest within the field of view of the end user), and generating the non-uniform resolution distribution for each of the displayed image frames based on the estimated focal point. Each of the non-uniform resolution distributions has a region of highest resolution coincident with the estimated focal point. The estimated focal point of the end user may have an error margin to provide a focal range within the field of the view of the end user, in which case, the region of highest resolution may intersect the focal range.

In accordance with a second aspect of the present inventions, a virtual image generation system for use by an end user is provided. The virtual image generation system comprises memory storing a three-dimensional scene, a control subsystem (which may comprise a graphics processor unit (GPU)) configured for rendering a plurality of synthetic image frames of the three-dimensional scene, and a display subsystem configured for sequentially displaying the plurality of image frames to the end user.

In one embodiment, the display subsystem is configured for being positioned in front of the eyes of the end user. In another embodiment, the display subsystem includes a projection subsystem and a partially transparent display surface. The projection subsystem is configured for projecting the image frames onto the partially transparent display surface, and the partially transparent display surface is configured for being positioned in the field of view between the eyes of the end user and an ambient environment. In an optional embodiment, the virtual image generation system further comprises a frame structure configured for being worn by the end user, in which case, the frame structure carries the display subsystem.

Significantly, each of the displayed image frames has a non-uniform resolution distribution. In one embodiment, the control subsystem is configured for rendering each of the image frames with the non-uniform resolution distribution. In another embodiment, the control subsystem is configured for rendering each of the image frames with a uniform resolution distribution, in which case, the display subsystem will be configured for displaying the respective image frame by incorporating the non-uniform resolution distribution into the already rendered image frame. The resolution distribution of each of the displayed image frames may have a slope that matches or is even greater than the slope of an acuity distribution of an eye of the end user. The display subsystem may be configured for displaying the image frames by scanning the image frames. For example, the display subsystem may be configured for scanning each of the image frames in a spiral pattern, in which case, the non-uniform resolution distribution radially varies, or may be configured for scanning the image frames in a raster pattern, in which case, the non-uniform resolution distribution rectilinearly varies.

In one embodiment, at least two of the displayed image frames have different non-uniform resolution distributions. In another embodiment, each of the displayed image frames has a plurality of discrete regions (e.g., at least three) having different resolutions. The shape of the discrete regions may be, e.g., annular, rectangular, or sector-shaped. The plurality of discrete regions may include a region of highest resolution, in which case, the control subsystem may be configured for selecting the region of highest resolution from a field of view template having a plurality of discrete regions, which may overlap with each other. The plurality of discrete region may also include a region of lower resolution, in which case, the control subsystem may be configured for blurring the displayed image frames in the region of lower resolution. For example, if the display subsystem is configured for scanning each of the displayed image frames, the display subsystem may be configured for blurring the displayed image frames by dithering scan lines in adjacent displayed image frames in the region of lower resolution. Or, the display subsystem may be configured for blurring the displayed image frames by defocusing the displayed image frames in the region of lower resolution.

In an optional embodiment, the control subsystem is configured for estimating a focal point of an eye within a field of view of the end user, and generating the non-uniform resolution distribution for each of the displayed image frames based on the estimated focal point. Each of the non-uniform resolution distributions may have a region of highest resolution coincident with the estimated focal point. The estimated focal point of the end user may have an error margin to provide a focal range within the field of the view of the end user, in which case, the region of highest resolution will intersect the focal range. The virtual image generation system may further comprise one or more sensors configured for detecting the focal point of the end user, in which case, the control subsystem may be configured for estimating the focal point from the detected focal point. Or, the control subsystem may be configured for estimating the focal point by identifying an object of interest in the field of view of the end user.

Additional and other objects, features, and advantages of the invention are described in the detail description, figures and claims.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 12b is a plot of a conventional scan line density distribution and a spiral scan line density distribution as a function of the angle from a scan origin, wherein the spiral scan line density distribution is generated by the virtual image generation system of FIG. 2 when the focal point is halfway between the center of the scan area and the outer edge of the scan area;

FIG. 16a is a plot of a spiral scan pattern generated with a high-density resolution region at one radial location of the scan area by the virtual image generation system of FIG. 2;

FIG. 16b is a plot of a spiral scan pattern generated with a high-density resolution region at another radial location of the scan area by the virtual image generation system of FIG. 2;

FIG. 18a is a plot of a raster scan pattern generated with discrete scan line resolution regions by the virtual image generation system of FIG. 2 when the focal point is at the center of the scan area;

FIG. 18b is a plot of a raster scan pattern generated with discrete scan line resolution regions by the virtual image generation system of FIG. 2 when the focal point is at the periphery of the scan area;

FIG. 20a is a plot of is a spiral scan pattern generated with discrete scan line resolution regions by the virtual image generation system of FIG. 2 when the focal point is at the center of the field of view template of FIG. 19;

FIG. 20b is a plot of is a spiral scan pattern generated with discrete scan line resolution regions by the virtual image generation system of FIG. 2 when the focal point is at the periphery of the field of view template of FIG. 19;

DETAILED DESCRIPTION

The description that follows relates to display systems and methods to be used in virtual reality and/or augmented reality systems. However, it is to be understood that the while the invention lends itself well to applications in virtual or augmented reality systems, the invention, in its broadest aspects, may not be so limited.

Figure 1:
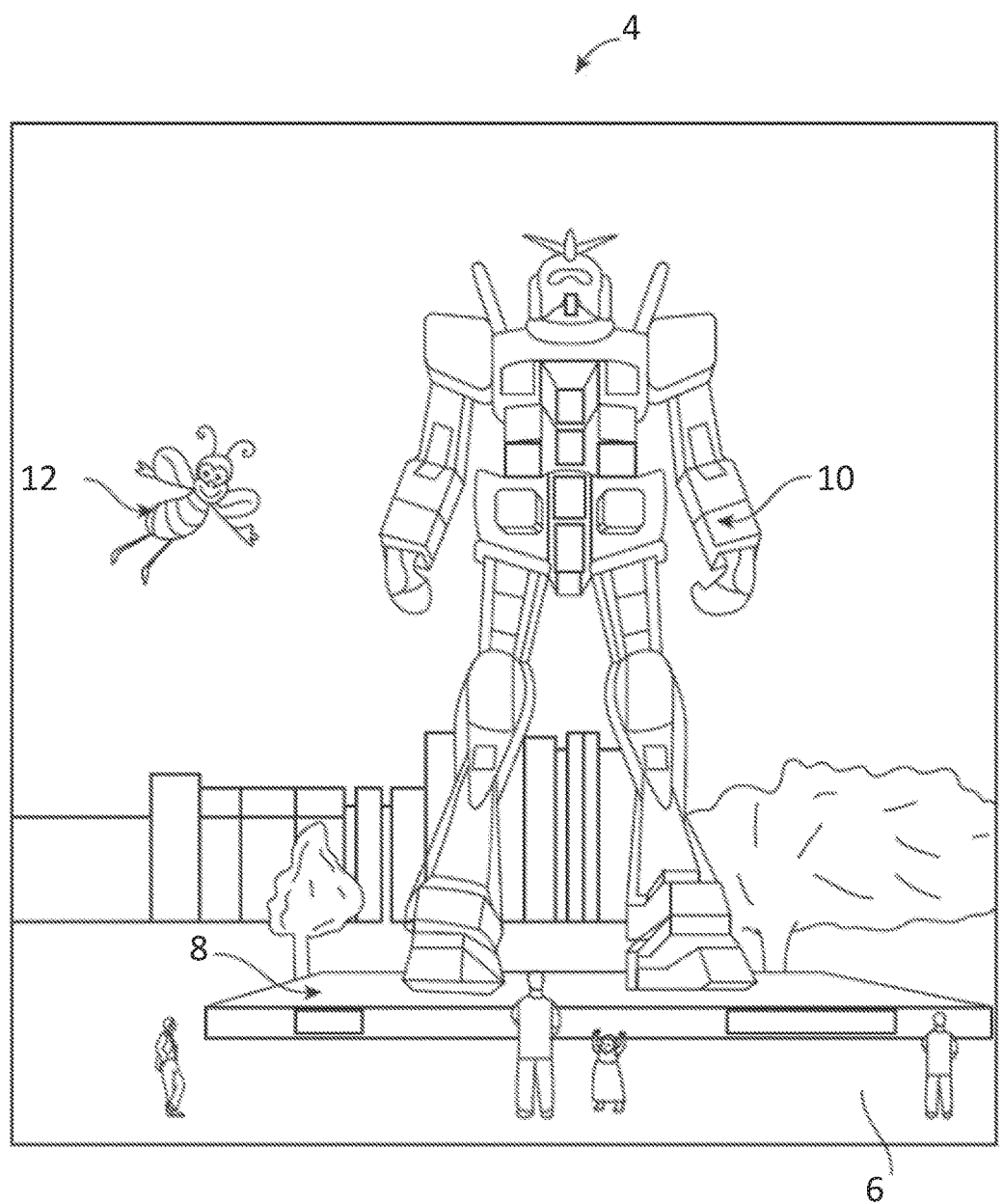
FIG. 1 is a picture of a three-dimensional augmented reality scene that can be displayed to an end user by a prior art augmented reality generation device.
Figure 2:
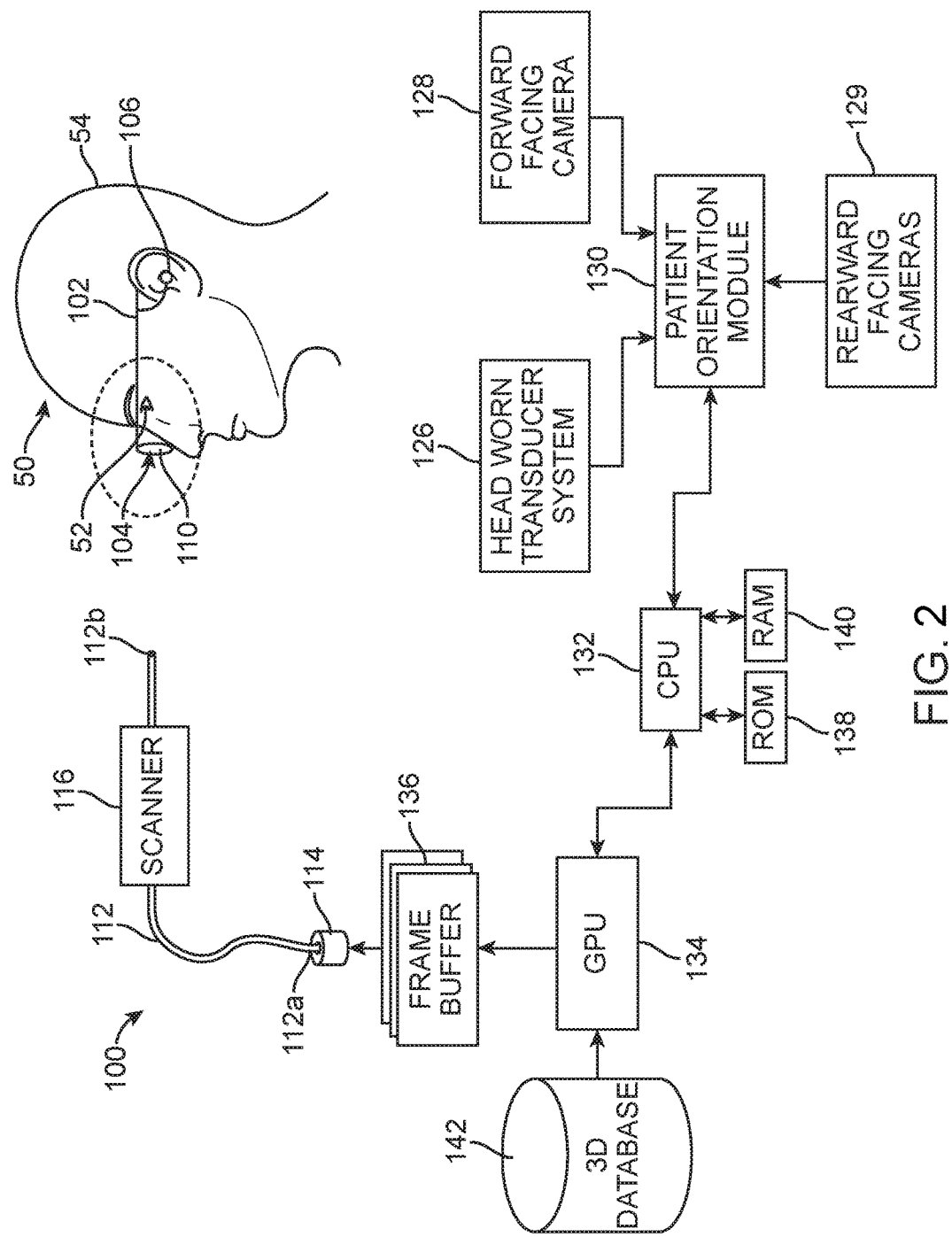
FIG. 2 is a block diagram of a virtual image generation system constructed in accordance with one embodiment of the present inventions.

Referring to FIG. 2, one embodiment of a virtual image generation system 100 constructed in accordance with present inventions will now be described. The virtual image generation system 100 may be operated as an augmented reality subsystem, providing images of virtual objects inter-mixed with physical objects in a field of view of an end user 50. There are two fundamental approaches when operating the virtual image generation system 100. A first approach employs one or more imagers (e.g., cameras) to capture images of the ambient environment. The virtual image generation system 100 inter-mixes the virtual images into the data representing the images of the ambient environment. A second approach employs one or more at least partially transparent surfaces through which the ambient environment can be seen and on to which the virtual image generation system 100 produces images of virtual objects.

The virtual image generation system 100, and the various techniques taught herein, may be employed in applications other than augmented reality and virtual reality subsystems. For example, various techniques may be applied to any projection or display subsystem. For example, the various techniques described herein may be applied to pico projectors where movement may be made by an end user's hand rather than the head. Thus, while often described herein in terms of an augmented reality subsystem or virtual reality subsystem, the teachings should not be limited to such subsystems of such uses.

At least for augmented reality applications, it may be desirable to spatially position various virtual objects relative to respective physical objects in a field of view of the end user 50. Virtual objects, also referred to herein as virtual tags or tag or call outs, may take any of a large variety of forms, basically any variety of data, information, concept, or logical construct capable of being represented as an image. Non-limiting examples of virtual objects may include: a virtual text object, a virtual numeric object, a virtual alpha-numeric object, a virtual tag object, a virtual field object, a virtual chart object, a virtual map object, a virtual instrumentation object, or a virtual visual representation of a physical object.

To this end, the virtual image generation system 100 comprises a frame structure 102 worn by an end user 50, a display subsystem 104 carried by the frame structure 102, such that the display subsystem 104 is positioned in front of the eyes 52 of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 104 is designed to present the eyes 52 of the end user 50 with photo-based radiation patterns that can be comfortably perceived as augmentations to physical reality, with high-levels of image quality and three-dimensional perception, as well as being capable of presenting two-dimensional content. The display subsystem 104 presents a sequence of synthetic image frames at high frequency that provides the perception of a single coherent scene.

In the illustrated embodiment, the display subsystem 104 comprises a projection subsystem 108 and a partially transparent display surface 110 on which the projection subsystem 108 projects images. The display surface 110 is positioned in the end user's 50 field of view between the eyes 52 of the end user 50 and an ambient environment. In the illustrated embodiment, the projection subsystem 108 includes one or more optical fibers 112 (e.g. single mode optical fiber), each of which has one end 112a into which light is received and another end 112b from which light is provided to the partially transparent display surface 110. The projection subsystem 108 may also include one or more light sources 114 that produces the light (e.g., emits light of different colors in defined patterns), and communicatively couples the light to the other end 112a of the optical fiber(s) 112. The light source(s) 114 may take any of a large variety of forms, for instance, a set of RGB lasers (e.g., laser diodes capable of outputting red, green, and blue light) operable to respectively produce red, green, and blue coherent collimated light according to defined pixel patterns specified in respective frames of pixel information or data. Laser light provides high color saturation and are highly energy efficient.

In the illustrated embodiment, the display surface 110 takes the form of a waveguide-based display into which the light from the optical fiber(s) 112 is injected into via an optical coupling arrangement (not shown) to produce, e.g., images at single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem may be monocular or binocular.

Figure 3:
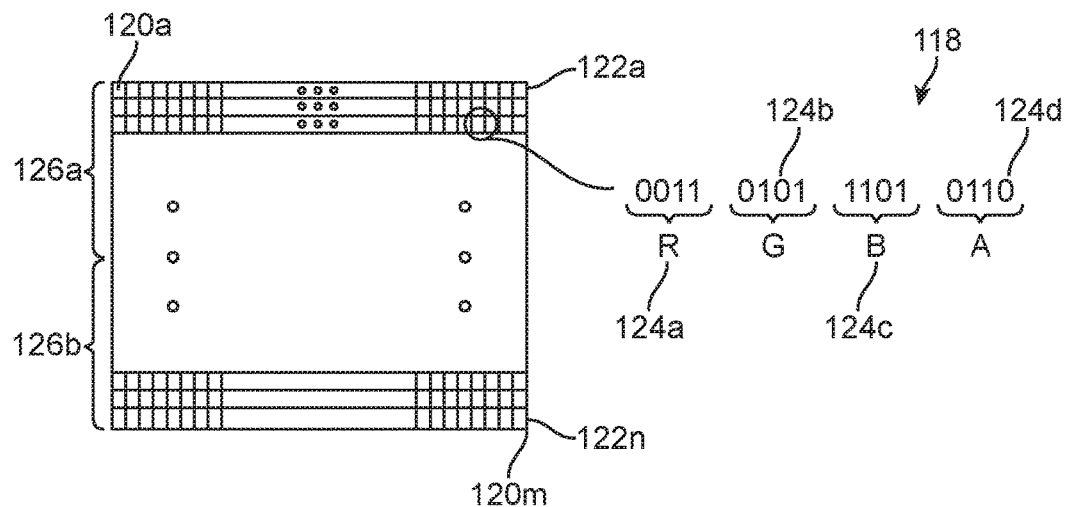
FIG. 3 is a plan view of an exemplary frame generated by the virtual image generation system of FIG. 2.

The display subsystem 104 may further comprise a scanning device 116 that scans the optical fiber(s) 112 in a predetermined pattern in response to control signals. For example, referring to FIG. 3, a synthetic image frame 118 of pixel information or data specifies pixel information or data to present an image, for example, an image of one or more virtual objects, according to one illustrated embodiment. The frame 118 is schematically illustrated with cells 120a-120m divided into horizontal rows or lines 122a-122n. Each cell 120 of the frame 118 may specify values for each of a plurality of colors for the respective pixel to which the cell 120 corresponds and/or intensities. For instance, the frame 118 may specify one or more values for red 124a, one or more values for green 124b, and one or more values for blue 124c for each pixel. The values 124 may be specified as binary representations for each of the colors, for instance, a respective 4-bit number for each color. Each cell 120 of the frame 118 may additionally include a value 124d that specifies an amplitude.

The frame 118 may include one or more fields, collectively 126. The frame 118 may consist of a single field. Alternatively, the frame 118 may comprise two, or even more fields 126a-126b. The pixel information for a complete first field 126a of the frame 118 may be specified before the pixel information for the complete second field 126b, for example occurring before the pixel information for the second field 126*b* in an array, an ordered list or other data structure (e.g., record, linked list). A third or even a fourth field may follow the second field 126*b*, assuming a presentation subsystem is configured to handle more than two fields 126*a*-126*b*.

Figure 4:
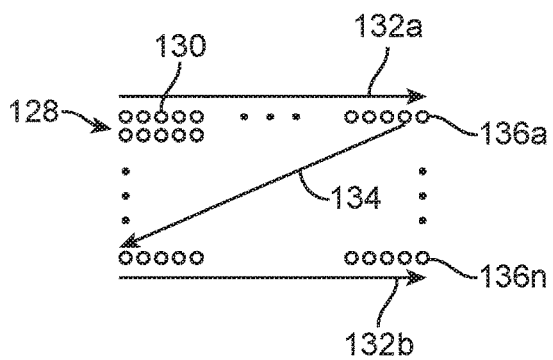
FIG. 4 is one scanning pattern that can be used to generate a frame.

Referring now to FIG. 4, the frame 118 is generated using a raster scan pattern 128. In the raster scan pattern 128, pixels 130 (only one called out) are sequentially presented. The raster scan pattern 128 typically presents pixels from left to right (indicated by arrows 132*a*, 132*b*, then from top to bottom (indicated by arrow 134). Thus, the presentation may start at the upper right corner and traverse left across a first line 136*a* until the end of the line is reached. The raster scan pattern 128 typically then starts from the left in a next line down. The presentation may be temporarily blacked out or blanked when returning from the end of one line to the start of the next line. This process repeats line-by-line until the bottom line 136*n* is completed, for example at the bottom right most pixel. With the frame 118 being complete, a new frame is started, again returning the right of the top most line of the next frame. Again, the presentation may be blanked while returning from the bottom left to the top right to present the next frame.

Many implementations of raster scanning employ what is termed as an interlaced scan pattern. In interlaced raster scan patterns, lines from the first and the second fields 126*a*, 126*b* are interlaced. For example, when presenting lines of the first field 126*a*, the pixel information for the first field 126*a* may be used for the odd numbered lines only, while the pixel information for the second field 126*b* may be used for the even numbered lines only. Thus, all of the lines of the first field 126*a* of the frame 118 (FIG. 3) are typically presented before the lines of the second field 126*b*. The first field 126*a* may be presented using the pixel information of the first field 126*a* to sequentially present line 1, line 3, line 5, etc. Then the second field 126*b* of the frame 118 (FIG. 3) may be presented following the first field 126*a*, by using the pixel information of the second field 126*b* to sequentially present line 2, line 4, line 6, etc.

Figure 5:
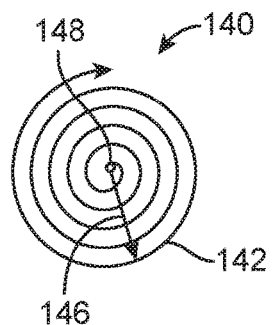
FIG. 5 is another scanning pattern that can be used to generate a frame.

Referring to FIG. 5, a spiral scan pattern 140 may be used instead of the raster scan pattern 128 to generate the frame 118. The spiral scan pattern 140 may consist of a single spiral scan line 142, which may include one or more complete angular cycles (e.g., 360 degrees) which may be denominated as coils or loops. As with the raster scan pattern 128 illustrated in FIG. 4, the pixel information in the spiral scan pattern 140 is used to specify the color and/or intensity of each sequential pixel, as the angle increments. An amplitude or radial value 146 specifies a radial dimension from a starting point 148 of the spiral scan line 142.

Figure 6:
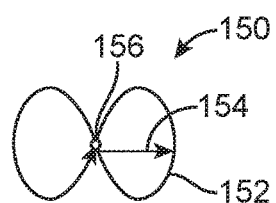
FIG. 6 is still another scanning pattern that can be used to generate a frame.

Referring to FIG. 6, a Lissajous scan pattern 150 may alternatively be used to generate the frame 118. The Lissajous scan pattern 150 may consist of a single Lissajous scan line 152, which may include one or more complete angular cycles (e.g., 360 degrees), which may be denominated as coils or loops. Alternatively, the Lissajous scan pattern 150 may include two or more Lissajous scan lines 152, each phase shifted with respect to one another to nest the Lissajous scan lines 152. The pixel information is used to specify the color and/or intensity of each sequential pixel, as the angle increments. An amplitude or radial value specifies a radial dimension 154 from a starting point 156 of the Lissajous scan line 152.

Figure 7:
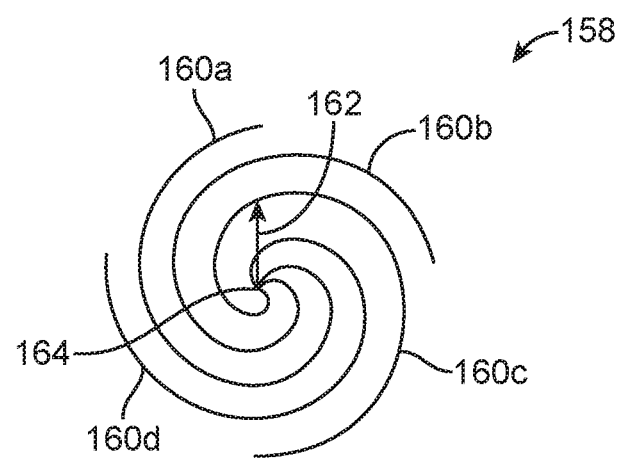
FIG. 7 is yet another scanning pattern that can be used to generate a frame.

Referring to FIG. 7, a multi-field spiral scan pattern 158 may alternatively be used to generate the frame 118. The multi-field spiral scan pattern 158 includes two or more distinct spiral scan lines, collectively 160, and in specifically, four spiral scan lines 160*a*-160*d*. The pixel information for each spiral scan line 160 may be specified by a respective field of a frame. Advantageously, multiple spiral scan lines 160 may be nested simply by shifting a phase between each successive ones of the spiral scan lines 160. The phase difference between spiral scan lines 160 should be a function of the total number of spiral scan lines 160 that will be employed. For example, four spiral scan lines 160*a*-160*d* may be separated by a 90 degree phase shift. An exemplary embodiment may operate at a 100 Hz refresh rate with 10 distinct spiral scan lines (i.e., subspirals). Similar to the embodiment of FIG. 5, one or more amplitude or radial values specify a radial dimension 162 from a starting point 164 of the spiral scan lines 160.

Further details describing display subsystems are provided in U.S. Provisional Patent Application Ser. No. 61/801,219, entitled "Display Subsystem and Method", and U.S. Utility patent application Ser. No. 14/331,218, entitled "Planar Waveguide Apparatus With Diffraction Element(s) and Subsystem Employing Same", which are expressly incorporated herein by reference.

Referring back to FIG. 2, the virtual image generation system 100 further comprises one or more sensors (not shown) mounted to the frame structure 102 for detecting the position and movement of the head 54 of the end user 50 and/or the eye position and inter-ocular distance of the end user 50. Such sensor(s) may include image capture devices (such as cameras), microphones, inertial measurement units, accelerometers, compasses, GPS units, radio devices, and/or gyros).

Referring back to FIG. 2, the virtual image generation system 100 further comprises one or more sensors (not shown) mounted to the frame structure 102 for detecting the position and movement of the head 54 of the end user 50 and/or the eye position and inter-ocular distance of the end user 50. Such sensor(s) may include image capture devices (such as cameras), microphones, inertial measurement units, accelerometers, compasses, GPS units, radio devices, and/or gyros).

For example, in one embodiment, the virtual image generation system 100 comprises a head worn transducer subsystem 126 that includes one or more inertial transducers to capture inertial measures indicative of movement of the head 54 of the end user 50. Such may be used to sense, measure, or collect information about the head movements of the end user 50. For instance, such may be used to detect measurement movements, speeds, acceleration, and/or positions of the head 54 of the end user 50.

The virtual image generation system 100 further comprises one or more forward facing cameras 128, which may be used to capture information about the environment in which the end user 50 is located. The forward facing camera(s) 128 may be used to capture information indicative of distance and orientation of the end user 50 with respect to that environment and specific objects in that environment. When head worn, the forward facing camera(s) 128 is particularly suited to capture information indicative of distance and orientation of the head 54 of the end user 50 with respect to the environment in which the end user 50 is located and specific objects in that environment. The forward facing camera(s) 128 may, for example, be employed to detect head movement, speed, and/or acceleration of head movements. The forward facing camera(s) 128 may, for example, be employed to detect or infer a center of attention of the end user 50, for example, based at least in part on an orientation of the head 54 of the end user 50. Orientation may be detected in any direction (e.g., up/down, left, right with respect to the reference frame of the end user 50).

The virtual image generation system 100 further comprises a pair of rearward facing cameras 129 to track movement, blinking, and depth of focus of the eyes 52 of the end user 50. Such eye tracking information may, for example, be discerned by projecting light at the end user's eyes, and detecting the return or reflection of at least some of that projected light. Further details discussing eye tracking devices are provided in U.S. Patent Application Ser. No. 61/801,219, entitled "Display Subsystem and Method," U.S. Patent Application Ser. No. 62/005,834, entitled "Methods and Subsystem for Creating Focal Planes in Virtual and Augmented Reality," and U.S. Patent Application Ser. No. 61/776,771, entitled "Subsystem and Method for Augmented and Virtual Reality," which are expressly incorporated herein by reference.

The virtual image generation system 100 further comprises a patient orientation detection module 130. The patient orientation module 130 detects the instantaneous position of the head 54 of the end user 50 and may predict the position of the head 54 of the end user 50 based on position data received from the sensor(s). Significantly, detecting the instantaneous position of the head 54 of the end user 50 facilitates determination of the specific actual object that the end user 50 is looking at, thereby providing an indication of the specific textual message to be generated for that actual object and further providing an indication of the textual region in which the textual message is to be streamed. The patient orientation module 130 also tracks the eyes 52 of the end user 50 based on the tracking data received from the sensor(s).

The virtual image generation system 100 further comprises a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

In the illustrated embodiment, the virtual image generation system 100 comprises a central processing unit (CPU) 132, a graphics processing unit (GPU) 134, and one or more frame buffers 136. The CPU 132 controls overall operation, while the GPU 134 renders frames (i.e., translating a three-dimensional scene into a two-dimensional image) from three-dimensional data stored in the remote data repository 150 and stores these frames in the frame buffer(s) 136. While not illustrated, one or more additional integrated circuits may control the reading into and/or reading out of frames from the frame buffer(s) 136 and operation of the scanning device of the display subsystem 104. Reading into and/or out of the frame buffer(s) 146 may employ dynamic addressing, for instance, where frames are over-rendered. The virtual image generation system 100 further comprises a read only memory (ROM) 138 and a random access memory (RAM) 140. The virtual image generation system 100 further comprises a three-dimensional data base 142 from which the GPU 134 can access three-dimensional data of one or more scenes for rendering frames.

Figure 8A:
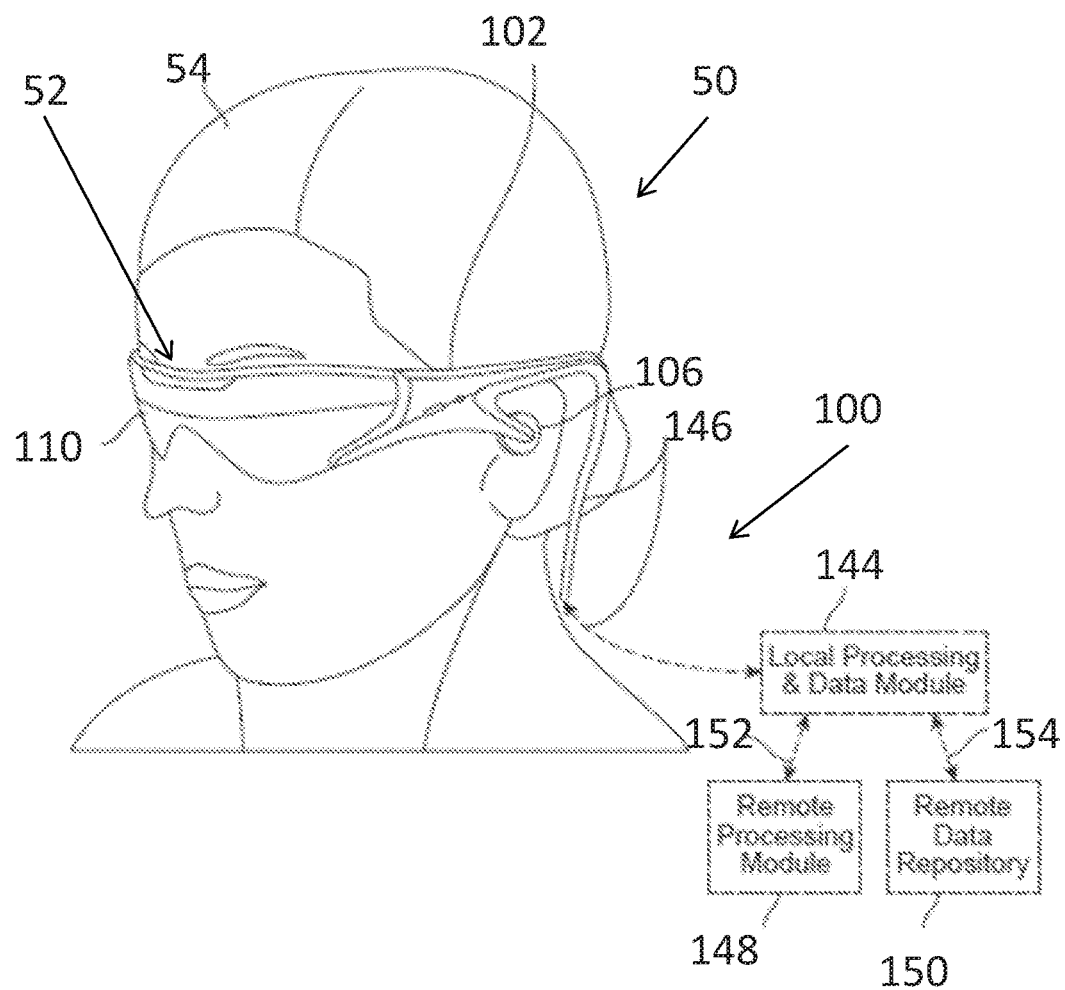
FIG. 8A is a view of one technique that can be used to wear the virtual image generation system of FIG. 2.
Figure 8B:
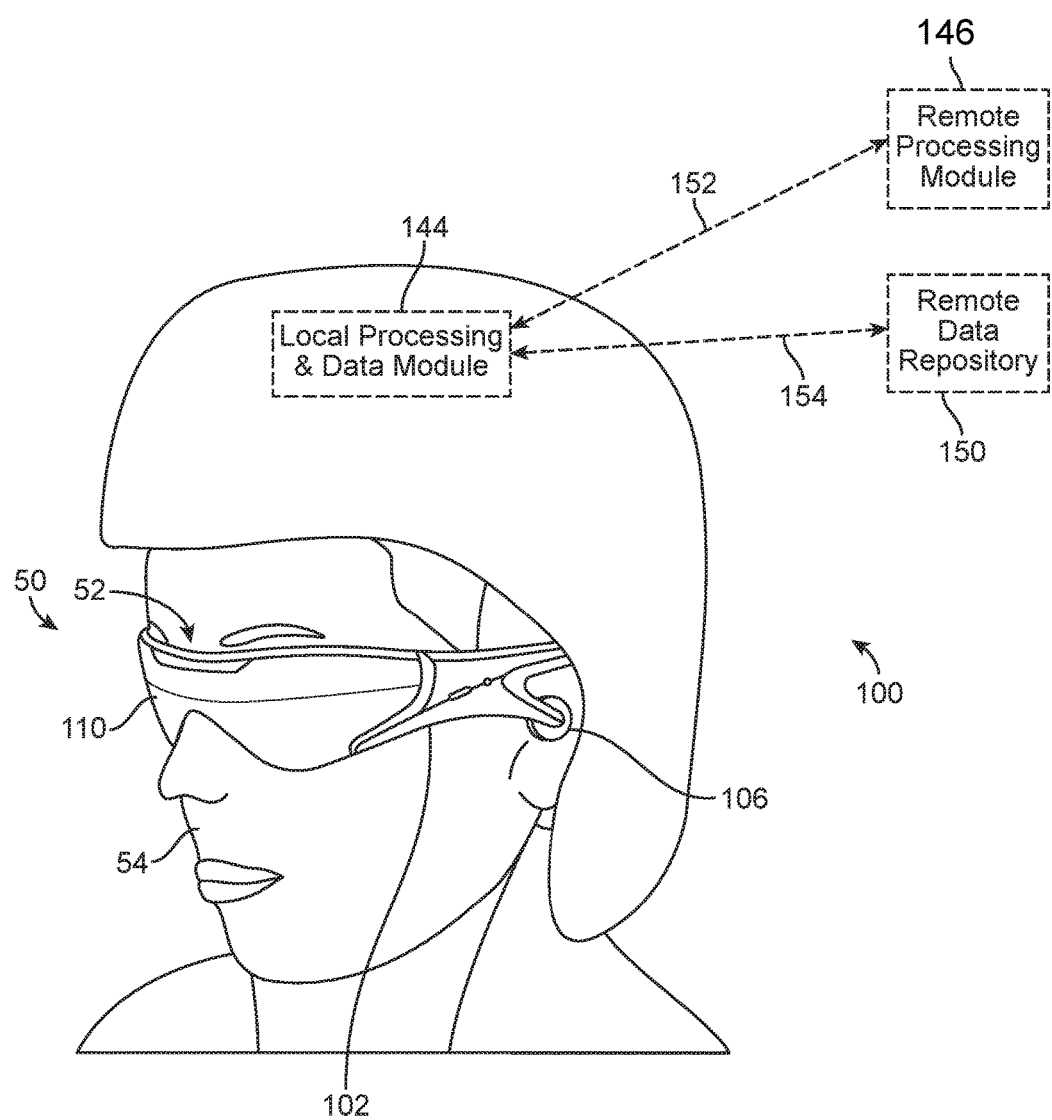
FIG. 8B is a view of another technique that can be used to wear the virtual image generation system of FIG. 2.
Figure 8C:
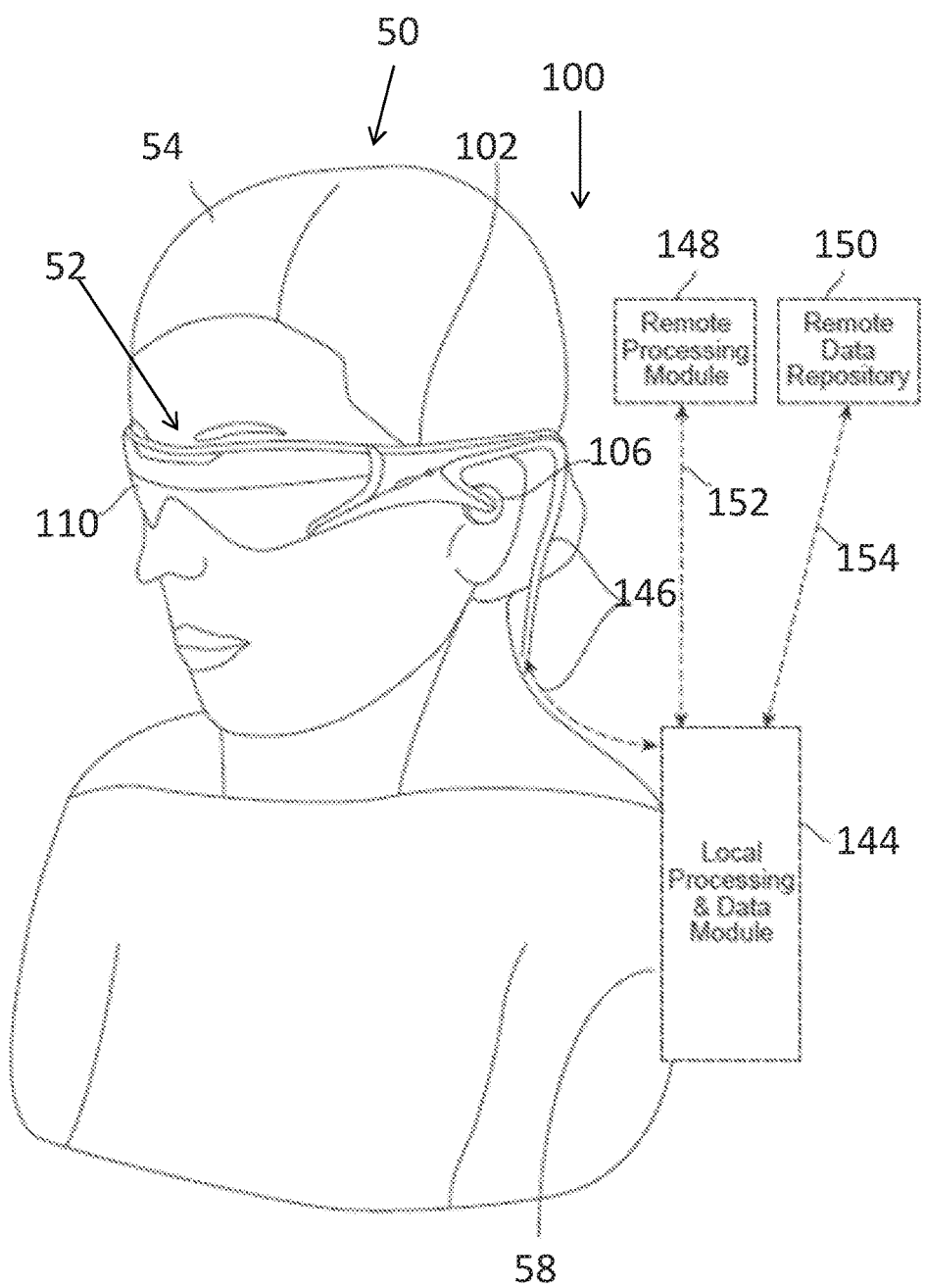
FIG. 8C is a view of still another technique that can be used to wear the virtual image generation system of FIG. 2.
Figure 8D:
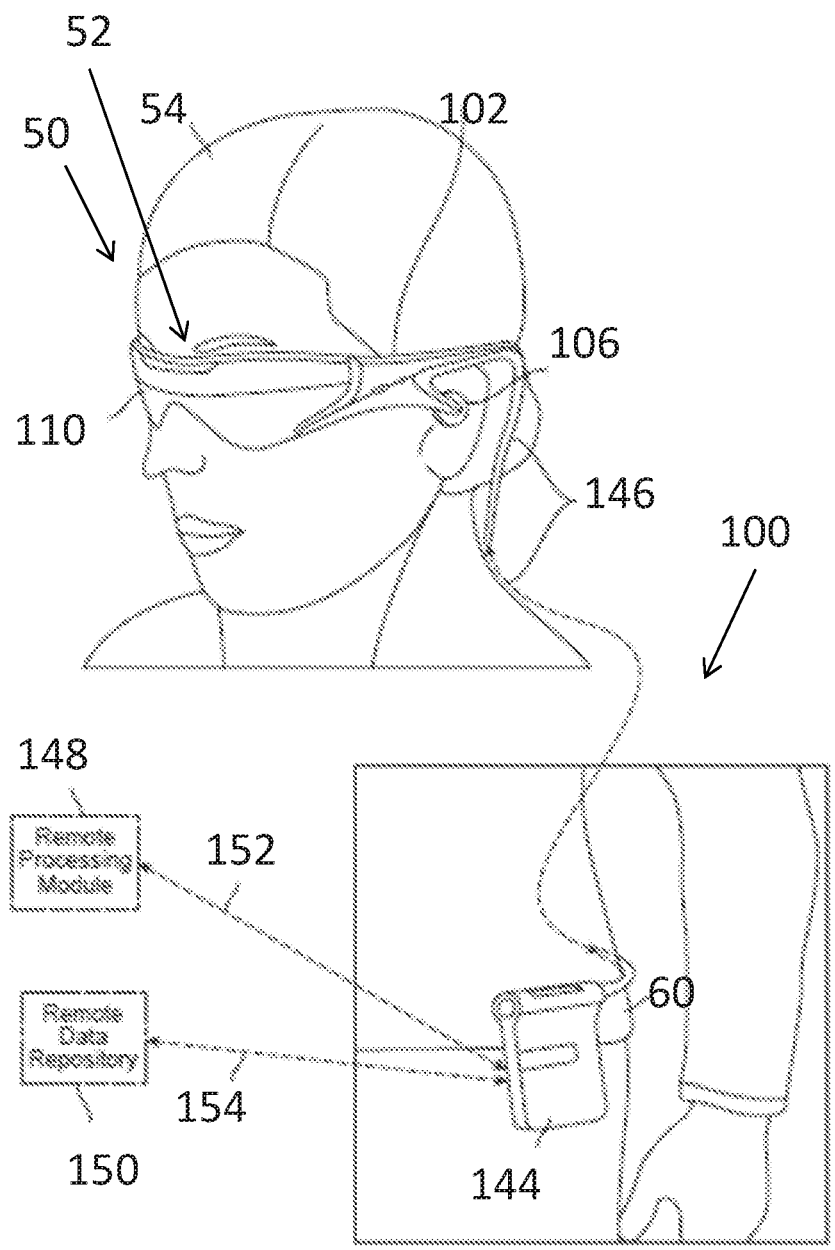
FIG. 8D is a view of yet another technique that can be used to wear the virtual image generation system of FIG. 2.

The various processing components of the virtual image generation system 100 may be physically contained in a distributed subsystem. For example, as illustrated in FIGS. 8a-8d, the virtual image generation system 100 comprises a local processing and data module 144 operatively coupled, such as by a wired lead or wireless connectivity 146, to the display subsystem 104 and sensors. The local processing and data module 144 may be mounted in a variety of configurations, such as fixedly attached to the frame structure 102 (FIG. 8a), fixedly attached to a helmet or hat 56 (FIG. 8b), embedded in headphones, removably attached to the torso 58 of the end user 50 (FIG. 8c), or removably attached to the hip 60 of the end user 50 in a belt-coupling style configuration (FIG. 8d). The virtual image generation system 100 further comprises a remote processing module 148 and remote data repository 150 operatively coupled, such as by a wired lead or wireless connectivity 150, 152, to the local processing and data module 144, such that these remote modules 148, 150 are operatively coupled to each other and available as resources to the local processing and data module 144.

The local processing and data module 144 may comprise a power-efficient processor or controller, as well as digital memory, such as flash memory, both of which may be utilized to assist in the processing, caching, and storage of data captured from the sensors and/or acquired and/or processed using the remote processing module 148 and/or remote data repository 150, possibly for passage to the display subsystem 104 after such processing or retrieval. The remote processing module 148 may comprise one or more relatively powerful processors or controllers configured to analyze and process data and/or image information. The remote data repository 150 may comprise a relatively large-scale digital data storage facility, which may be available through the internet or other networking configuration in a "cloud" resource configuration. In one embodiment, all data is stored and all computation is performed in the local processing and data module 144, allowing fully autonomous use from any remote modules.

The couplings 146, 152, 154 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 8A-8D. Thus, the particular choice of wired or wireless communications should not be considered limiting.

In the illustrated embodiment, the patient orientation module 130 is contained in the local processing and data module 144, while CPU 132 and GPU 134 are contained in the remote processing module 148, although in alternative embodiments, the CPU 132, GPU 124, or portions thereof may be contained in the local processing and data module 144. The 3D database 142 can be associated with the remote data repository 150.

Figure 9A:
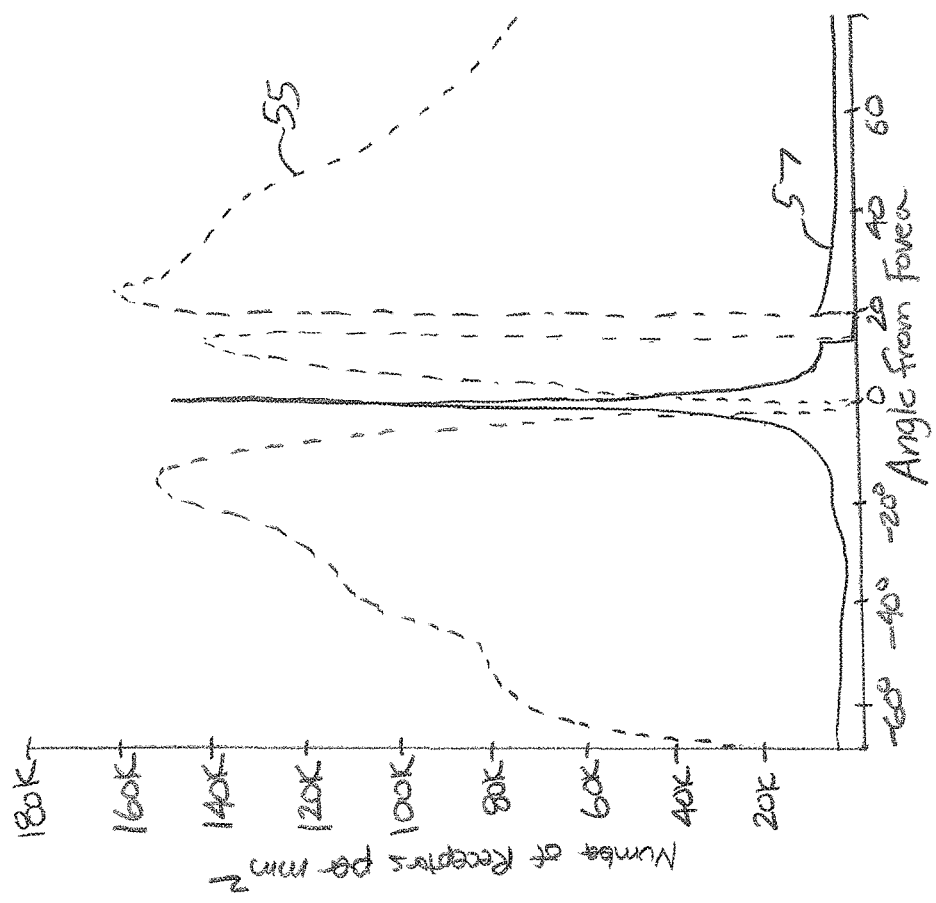
FIG. 9a is a plot of the number of rod receptors and cone receptors as a function of angle from the fovea of the human eye.
Figure 9B:
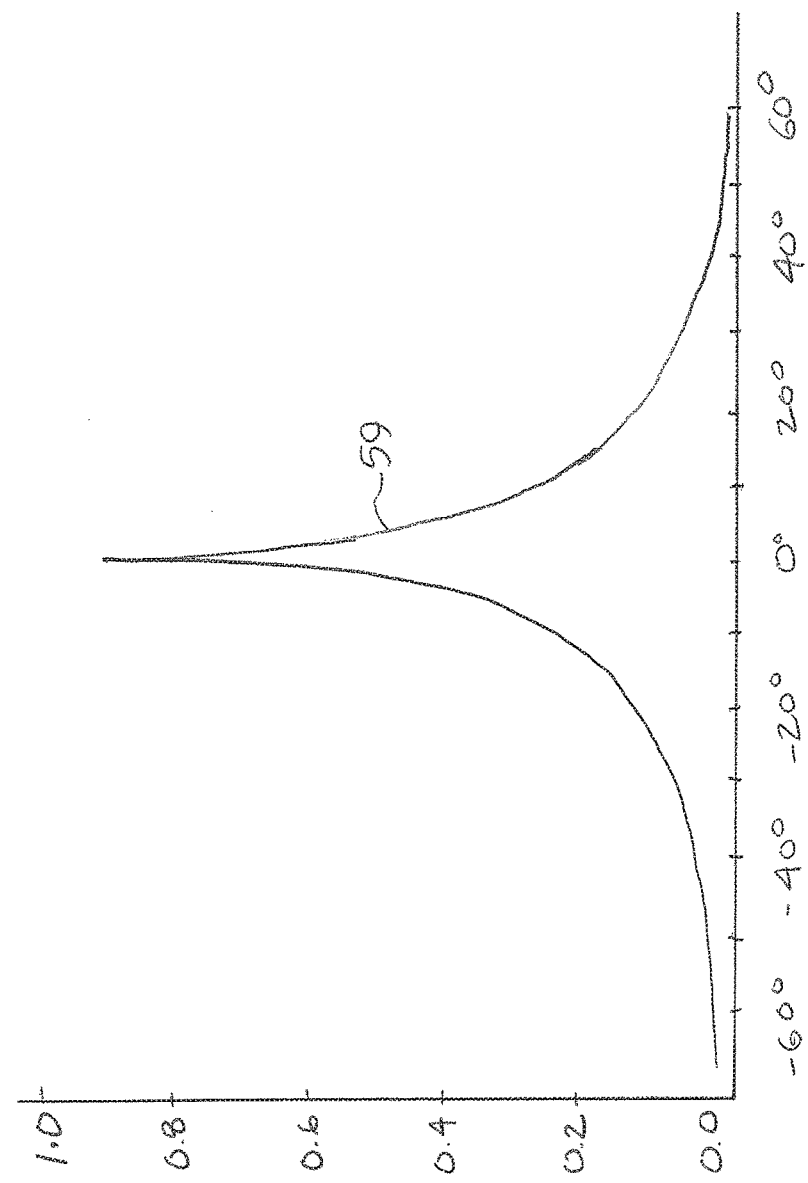
FIG. 9b is a plot of the visual acuity of a human eye as a function of the angle from the fovea of the human eye.

Significant to the present inventions, the virtual image generation system 100 performs a dynamic resolution region technique that renders a plurality of synthetic image frames of a three-dimensional scene, and sequentially displays them with a non-uniform resolution distribution to the end user 50. In the illustrated embodiment, the resolution distribution of each of the displayed image frames matches or is even sharper than the acuity distribution of the eye 54 of the end user 50. For example, with reference to FIGS. 9a-9b, on the retina of a human eye, distribution of light receptor cells is highly non-uniform, as represented by the light receptor curve for rod cells 55 and the light receptor curve for cone cells 57. As illustrated in FIG. 9a, a central region (fovea) of the retina (at 0°) contains the highest density of cone cells, which provide the highest visual acuity, as illustrated by the visual acuity curve 59 in FIG. 9b. The density of cone cells, and thus visual acuity, reduces rapidly in regions away from the fovea.

Accordingly, the dynamic resolution region technique performed by the virtual image generation system 100 attempts to locate the region of highest resolution in each of the frames coincident with the expected or presumed focal point of the eye 54 of the end user 50. Thus, it can be appreciated that for a virtual image generation system that cannot output a frame that densely populates the entire field of view of the end user 50 due to hardware (scanner speed) and/or software constraints (frame rendering speed), the system can still provide high image quality by dynamically changing the resolution of profile of each frame, such that the focal point of the eye 54 of the end user 50 is always in the region of highest resolution. In the illustrated embodiment, wherein a scanning device is used to present each frame to the end user 50, the resolution of any particular region in the frame will be adjusted by adjusting the scan line density in that region, thereby more efficiently displaying a frame without a substantial loss in image quality.

Figure 10:
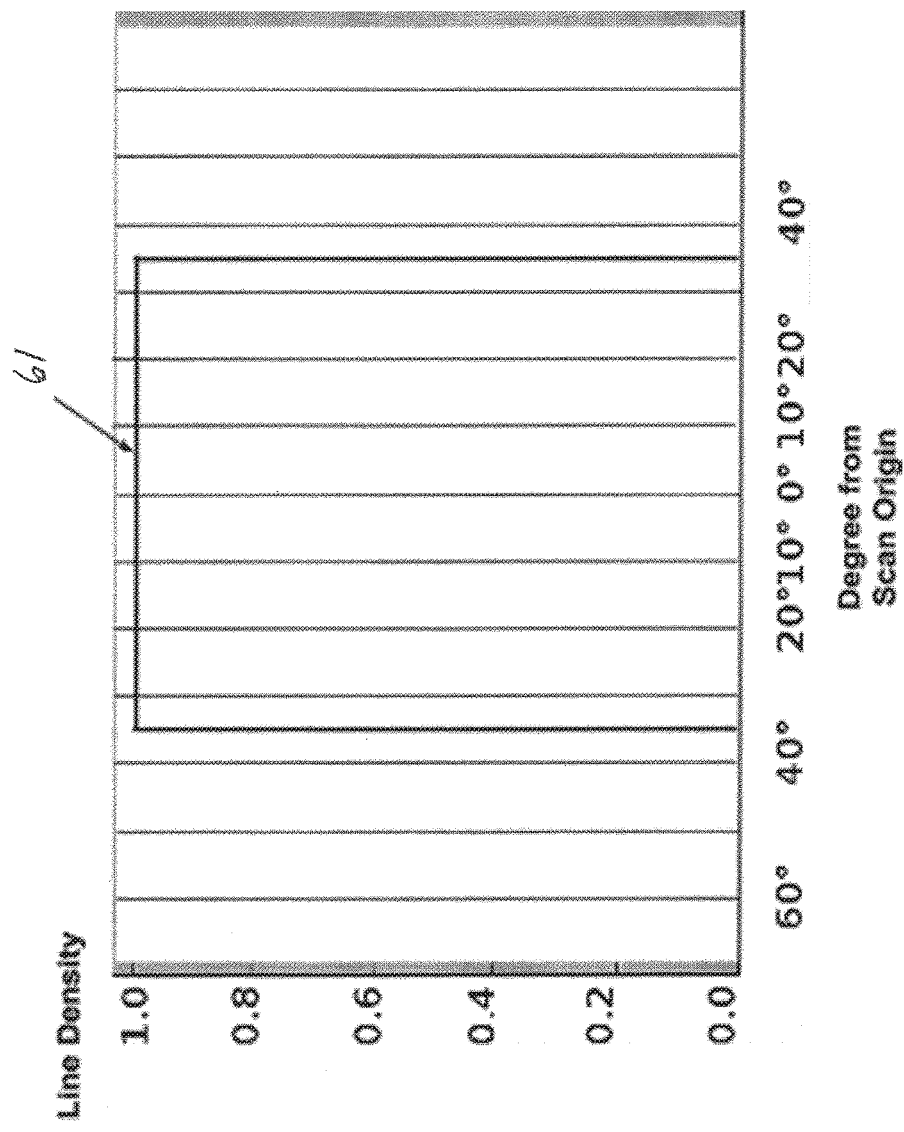
FIG. 10 is a plot of a conventional scan line density distribution as a function of the angle from a scan origin.

For example, if a uniform scan line density distribution 61 is assumed as in FIG. 10, the high scan line density where the eye is not focused is wasted. In particular, given the concentration eye-foveal acuity, if the eye is focused at 0 degrees in a 75 degree field of view (±35 degrees), the scan line density in the peripheral regions away from the center of the scan area (e.g., ±10-35 degrees) will be higher than necessary, resulting in inefficiencies in the display of the frame.

Figure 11:
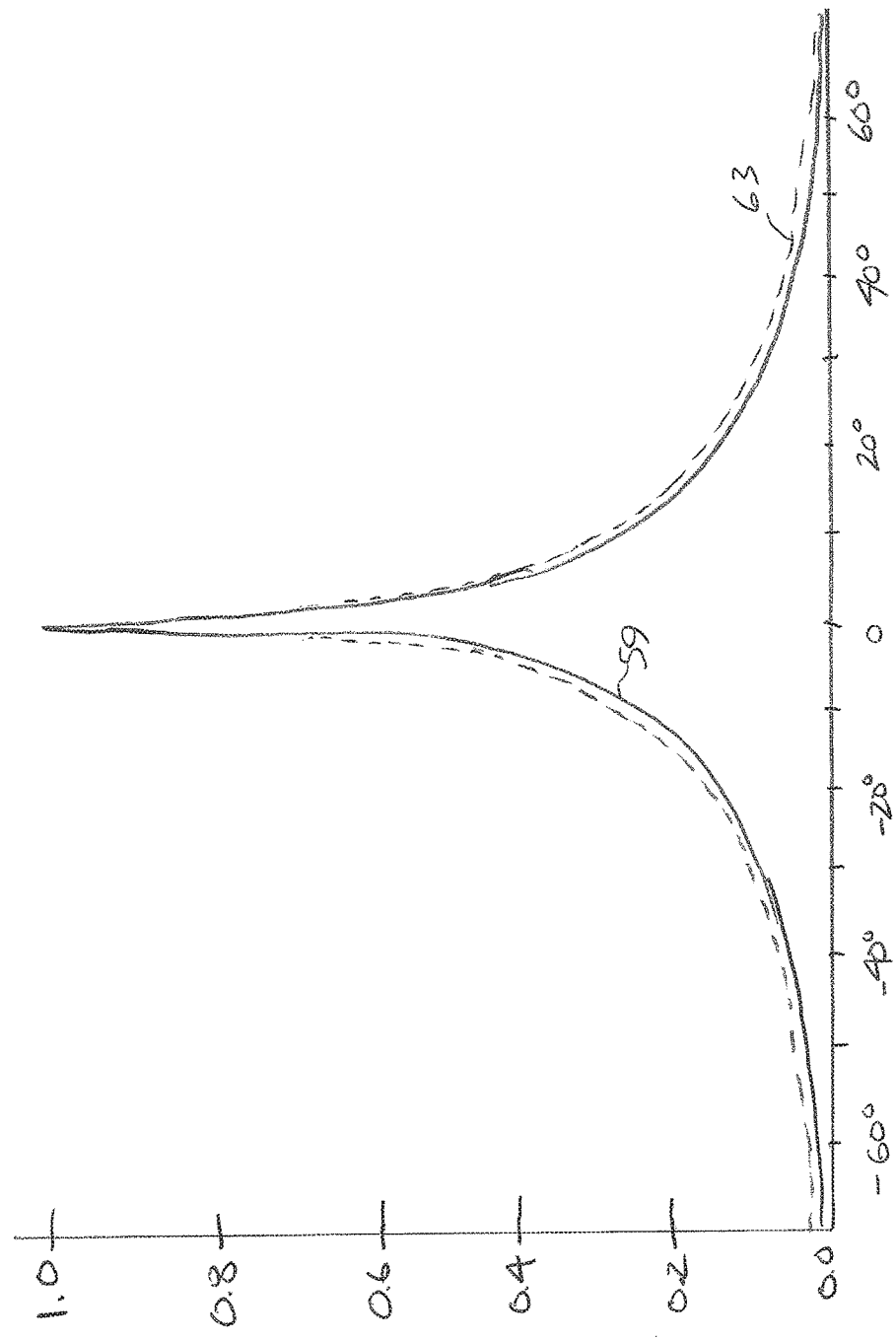
FIG. 11 is a plot of a scan line density distribution as a function of the angle from the scan origin, wherein scan line density distribution is matched to the human visual acuity distribution of FIG. 9b by the virtual image generation system of FIG. 2.

If, instead, the scan line density distribution 63 is matched to the human visual acuity distribution 59, as illustrated in FIG. 11, the scan line density in the peripheral regions away from the center of the scan area can be substantially decreased, thereby allowing the constraints of the scan-line/frame requirements to be significantly relaxed. If a curve is fit to the human eye-acuity distribution graph in FIG. 11, the resulting equation will be $f(\theta)=e^{-0.325 \cdot \theta^{0.8}}$, where f is the distribution density and $\theta$ is the angular eccentricity in degrees from the fovea center.

Figure 12A:
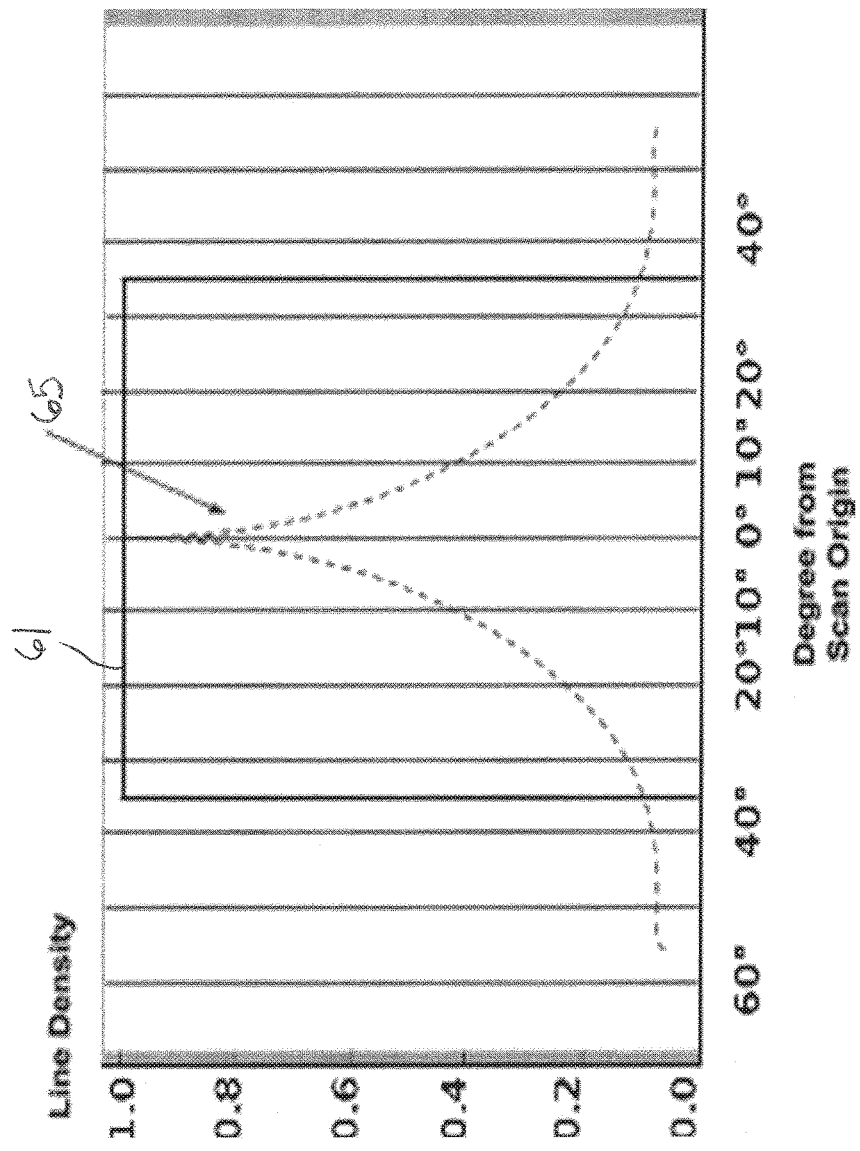
FIG. 12a is a plot of a conventional scan line density distribution and a spiral scan line density distribution as a function of the angle from a scan origin, wherein the spiral scan line density distribution is generated by the virtual image generation system of FIG. 2 when the focal point is at the center of the scan area.

If the eye is focused on the center of the scan area, and assuming a spiral scan pattern, then a scan line density distribution 65, as illustrated in FIG. 12a, would match the human visual acuity distribution 59, and if the eye is focused halfway between the center of the scan area and the outer edge of the scan area, due to the circular symmetry of spiral scans, the scan line density distribution 67, as illustrated in FIG. 12b, would match the human visual acuity distribution 59. Notably, the line density on the Y-axis of the graphs in FIGS. 12a and 12b is represented as a "unit" of lines/degree. The total lines needed per frame can be calculated by integrating the area beneath the scan line distribution curves over the scan area.

Thus, it can be appreciated that the object of dynamically changing the scan line density distribution is to maintain the fovea of the eye 54 of the end user 52 within the high density scan region. In one embodiment, the focal point of the eye within the field of view is detected, and the high density scan region is dynamically changed, such that it remains coincident with the detected focal point, thereby maintaining the fovea of the eye in the center of the high density scan region. In another embodiment, the high density scan region is dynamically changed, such that it remains coincident with an object of interest (either virtual or actual) in the field of view of the end user 50. In this case, it is assumed that the focal point of the end user 50 will be on the object of interest and/or any other objects in the field of view of the end user 50 are either insignificant or non-existent, and therefore, a decreased scan resolution in these areas would be sufficient.

Figure 13:
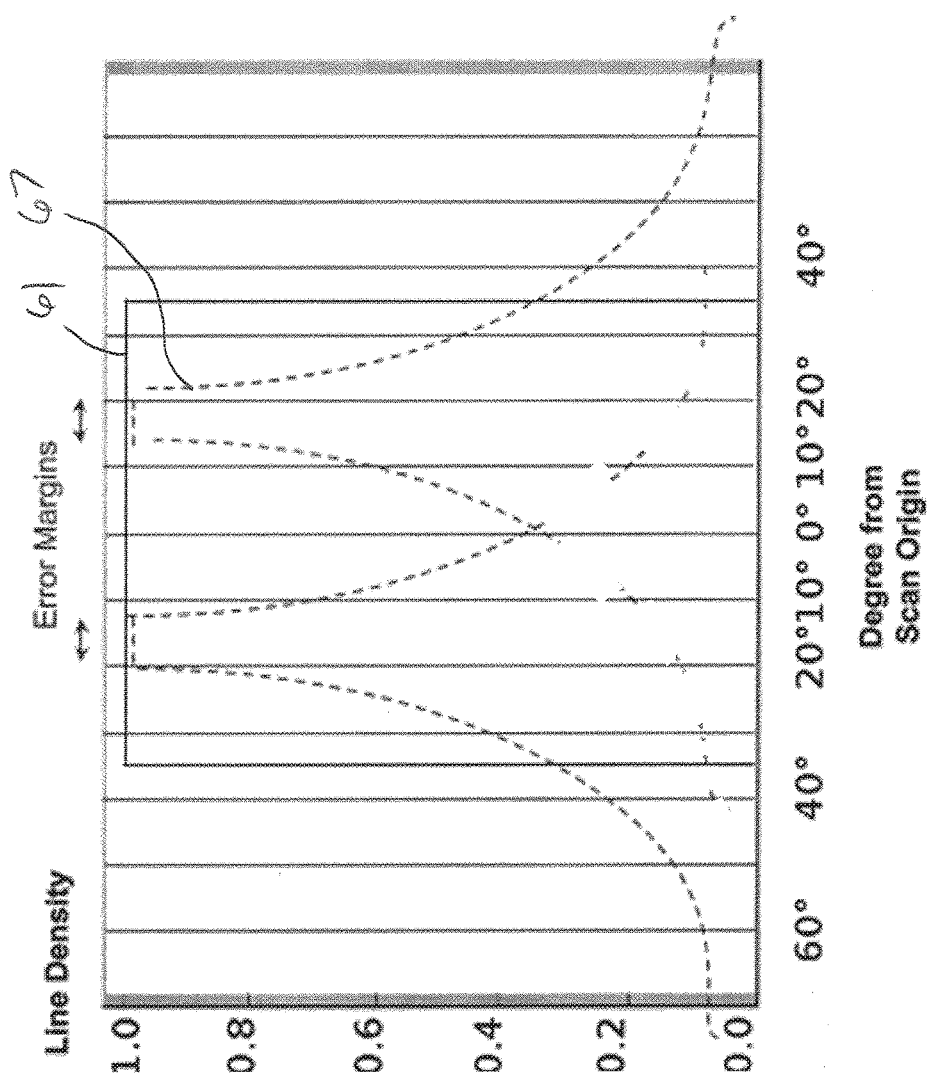
FIG. 13 is a plot of a conventional scan line density distribution and a spiral scan line density distribution as a function of the angle from a scan origin, wherein the spiral scan line density distribution is generated with a 5° error margin by the virtual image generation system of FIG. 2 when the focal point is halfway between the center of the scan area and the outer edge of the scan area.

To keep the fovea beneath the high resolution portion of the scan line density distribution, error margins may be included within the scan line density distribution to account for, e.g., inaccuracies in eye tracking and/or latency in eye tracking, head pose, rendering, and refresh rate. For a maximum head angular velocity of 300°/sec and a 60 frame per second update (slowest among eye tracking update, pose, render, or refresh rate), a 10° error (5° left and right) margin is needed to keep the eye fovea beneath the high resolution portion of the scan line density distribution. For a maximum head angular velocity of 150°/sec and a 60 frame per second update (slowest among eye tracking update, pose, render, or refresh rate), a 5° error (2.5° left and right) margin is needed to keep the eye fovea beneath the high resolution portion of the scan line density distribution. If a 10° error margin is included within the scan line distribution graph of FIG. 12b, the scan line density distribution curve 67 will expand as shown in FIG. 13.

Notably, the greater the error margin, the less efficient the dynamic region resolution technique becomes. Thus, to maximize the efficiency of the dynamic region resolution technique, the virtual image generation system 100 may dynamically change the error margin based on an assumed eye angular velocity profile, which may vary between different use-cases, applications, and/or periods. For example, when reading a book, eye movements are much slower than 300°/sec, and when examining a digital painting, the eye is almost stationary for periods of time. By making the error margin dynamic, the error margin can be reduced to zero at times, resulting in the highest effective resolution. For example, as further discussed below, when the error margin is 0, the resolution when the dynamic region resolution technique is employed can be approximately 2.8 times the resolution when the dynamic region resolution technique is not employed.

Figure 14:
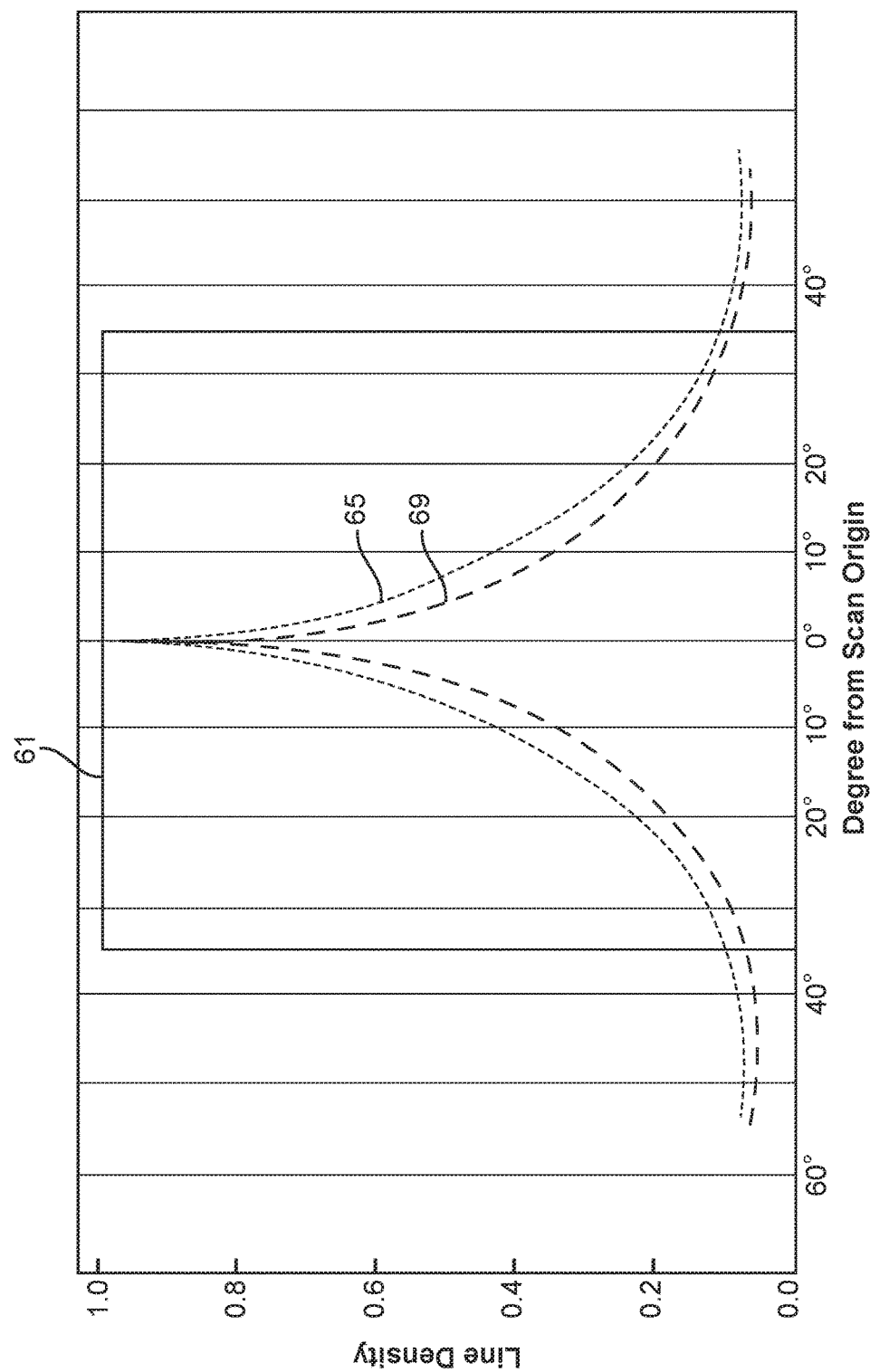
FIG. 14 is a plot of a is a plot of a conventional scan line density distribution, a first scan line density distribution, and a second scan line density distribution as a function of the angle from the scan origin, wherein the first scan line density distribution is matched to the human visual acuity distribution of FIG. 9b and the second scan line density distribution is made sharper than the human visual acuity distribution of FIG. 9b by the virtual image generation system of FIG. 2.

The dynamic resolution region technique may be made to be more efficient by, instead of exactly matching the human visual acuity distribution 59, making the scan density resolution distribution curve 69 steeper than human visual acuity distribution curve 59, as illustrated in FIG. 14. In this manner, retina resolution is obtained in the central regions, while sub-retina resolution obtained in the peripheral regions. Thus, very high resolution is achieved in the focal region of the field of view at the expense of lower resolution elsewhere in the field of view.

Figure 15:
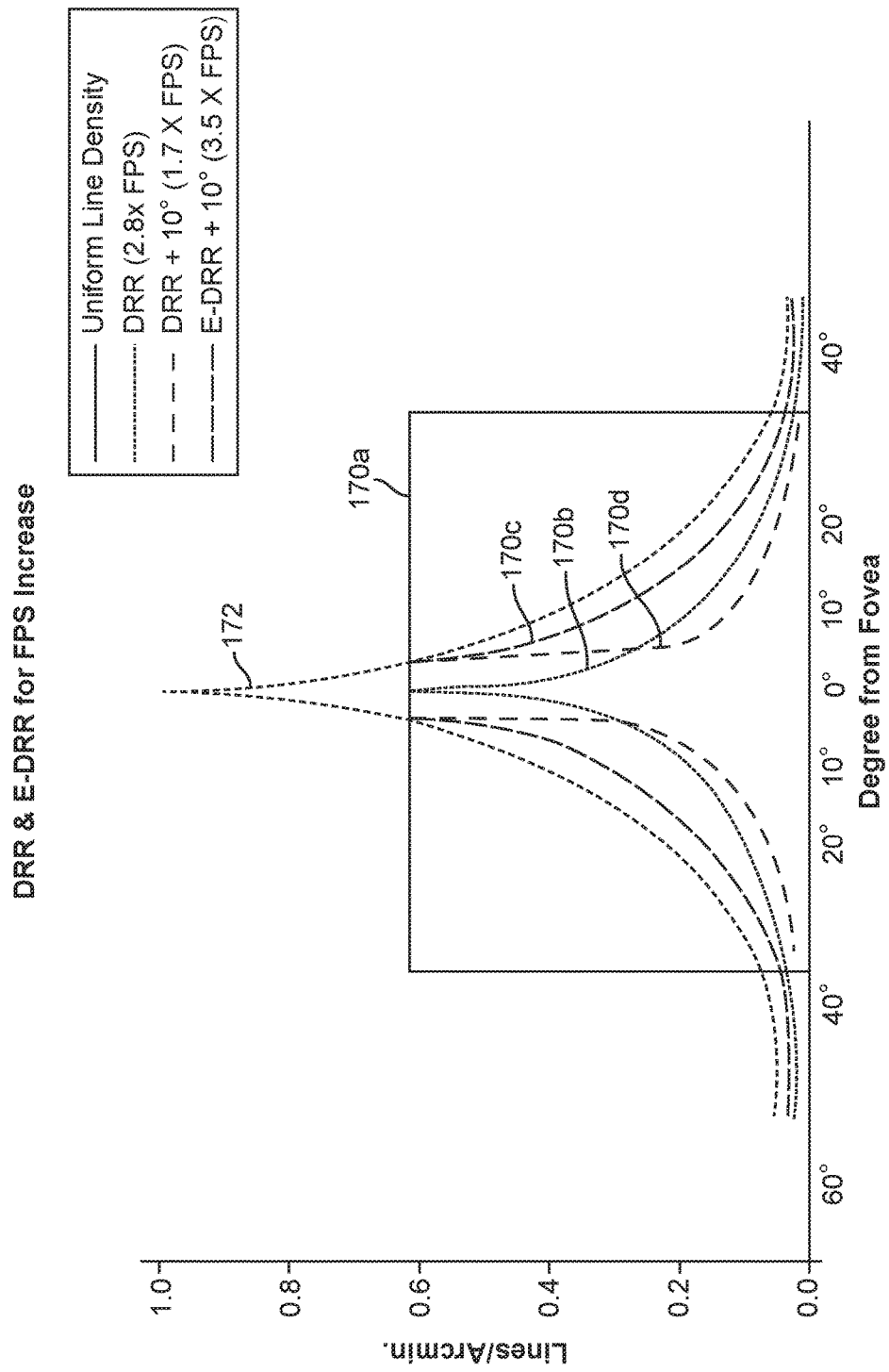
FIG. 15 is a plot of a conventional scan line density distribution, a first scan line density distribution, a second scan line density distribution, and a third scan line density distribution as a function of the angle from the scan origin, wherein the first scan line density distribution has no error margin and is matched to the human visual acuity distribution of FIG. 9b, the second scan line density distribution has a 5° error margin and is matched to the human visual acuity distribution of FIG. 9b, and the third scan line density distribution has a 5° error margin and is made sharper than the human visual acuity distribution of FIG. 9b by the virtual image generation system of FIG. 2.

Referring now to FIG. 15, the efficiencies of the dynamic resolution region technique when using different scan line resolution profiles can be compared. As there shown, a scan curve 170a resulting from a conventional scanning technique that uses uniform scan line density; a scan curve 170b resulting from a dynamic resolution region technique that matches the human visual acuity distribution curve 172 with no error margin; a scan curve 170c resulting from a dynamic resolution region technique that matches the human visual acuity distribution curve 172 with 10° error margin; and a scan curve 170d resulting from a dynamic resolution region technique that is sharper than the human visual acuity distribution curve 172 with 10° error margin are compared. It should be noted that although the peaks or plateaus of the scan curves 170b-170d are less than the peak of the human visual acuity distribution curve 172, the scan curves 170b-170c match the human visual acuity distribution curve 172 in that the slopes of the scan curves 170b-170c equal the slope of the visual acuity resolution curves, and the scan curve 170d is sharper than the human visual acuity distribution curve 172 in that the slope of the scan curve 170d is greater than the slope of the human visual acuity distribution curve 172.

Integrating under the scan curves 170 across the 70° scan area results in 70 units of lines per frame for scan curve 170a, 25.2 units of lines per frame for scan curve 170b, 41.3 units of lines per frame for scan curve 170c, and 20.1 units of lines per frame for scan curve 170d. This translates to an increased frame per second (FPS) for dynamic resolution region techniques, and in particular, an FPS for a dynamic resolution region technique that matches the visual acuity resolution with no error margin (scan curve 170b) equal to 2.8 times the FPS for the conventional scanning technique (scan curve 170a); an FPS for a dynamic resolution region technique that matches the visual acuity resolution with a 10° error margin (scan curve 170c) equal to 1.7 times the FPS for the conventional scanning technique (scan curve 170a); and an FPS for a dynamic resolution region technique that is sharper than the visual acuity resolution with 10° error margin (scan curve 170d) equal to 3.5 times the FPS for the conventional scanning technique (scan curve 170a).

Based on the foregoing, it should be understood that by utilizing a dynamic resolution region technique, the required scan lines required to display a frame can be substantially reduced, providing the potential to increase the frame scanning rate and/or to decrease the required scanner frequency, thereby increasing the mechanical/optical scanner design options available. It should also be appreciated from the foregoing that frame rendering speeds can also be reduced. For example, each frame can be rendered with a non-uniform resolution distribution, e.g., one that matches the visual acuity resolution, and then displayed to the end user 50 exactly as it has been rendered. Because the number of pixels required to render the frame has been reduced, the amount of time required to render the frame can accordingly be reduced, along with the increase in frame scanning rate and/or decrease in scanner frequency. Alternatively, each frame can be rendered with a uniform resolution distribution, in which case, the non-uniform resolution distribution can be incorporated into the frame by ignoring certain pixels within the rendered frame during the scanning process.

Having described the theory and advantages of several dynamic resolution region techniques, implementations of the dynamic resolution region techniques will now be described.

In one embodiment, assuming a spiral scan pattern is used in an image frame, the scan lines can be simplistically represented as concentric lines 200, as illustrated in FIGS. 16a-16b. While only six concentric scan lines 200 are illustrated for purposes of brevity and clarity, it should be appreciated that many more scan lines may be used in practice. If it is presumed that the end user 50 is focused at point 202a in the field of view, the highest scan line density in the frame will be used adjacent the point 202a, as represented by the more densely spaced scan lines 200b-d, and a lower scan density in the frame will be used in the region remote from point 202a, as represented by the more sparsely spaced scan lines 200a and 200e-f (FIG. 16a). If it is presumed that the end user 50 is now focused at point 202b, the highest scan line density in the frame will be used in the region adjacent point 202b, as represented by the more densely spaced scan lines 200d-f, and a lower scan density in the frame will be used in the region remote from point 202b, as represented by the more sparsely spaced scan lines 200a-c (FIG. 16b). Thus, it can be appreciated that by dynamically moving the region of highest line density to follow the focal point of the end user 50, the quality of the image frame may generally be increased using the same number of scan lines.

In one embodiment, the variance in the scan line density across the field of view is continuous (i.e., the spacing between adjacent pairs of scan lines will differ from each other). However, in one desirable embodiment, the variance in the scan line density across the field of view is discrete. That is, each image frame has a plurality of discrete regions having different resolutions.

Figure 17A:
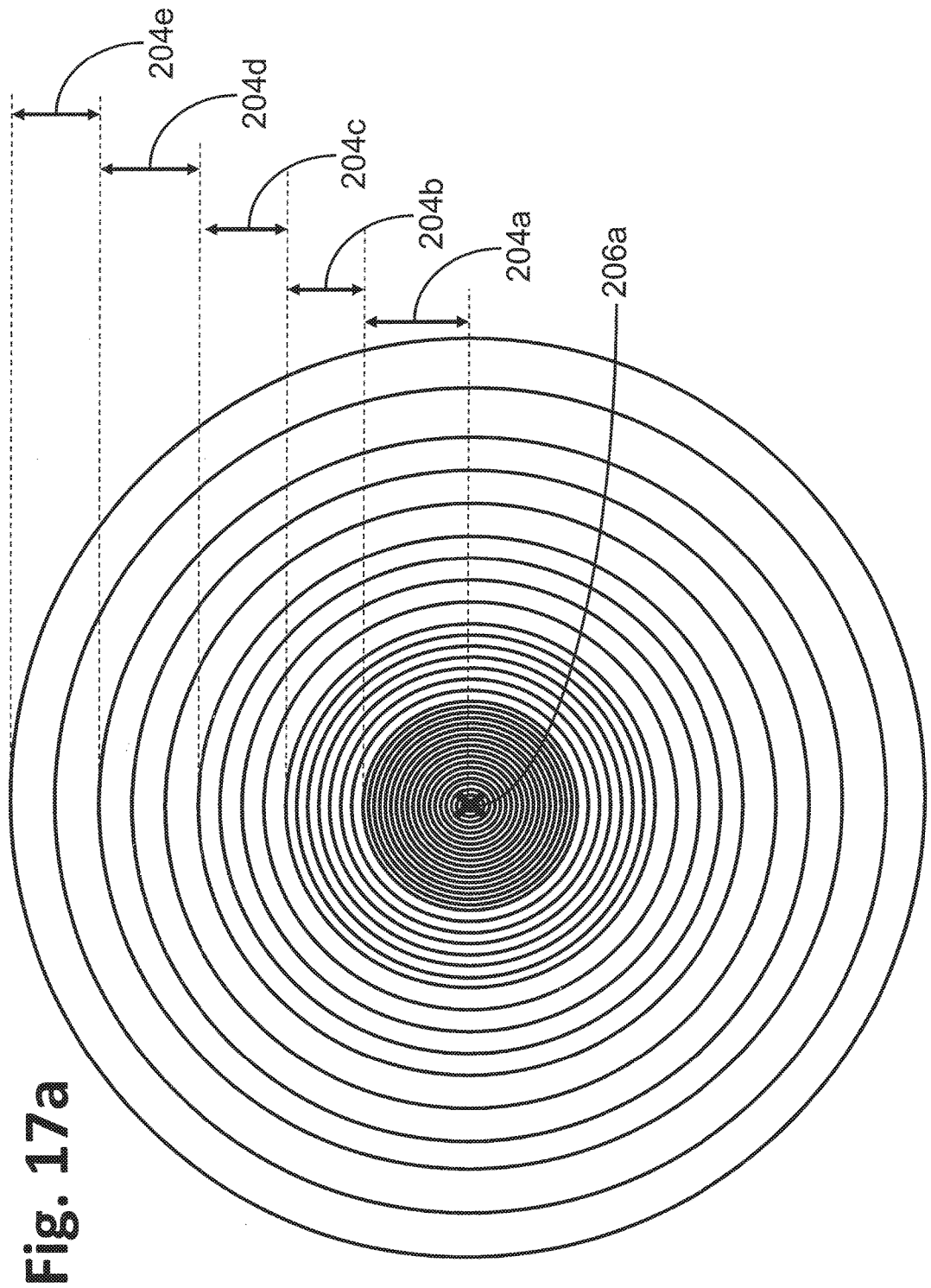
FIG. 17a is a plot of a spiral scan pattern generated with discrete scan line resolution regions by the virtual image generation system of FIG. 2 when the focal point is at the center of the scan area.
Figure 17B:
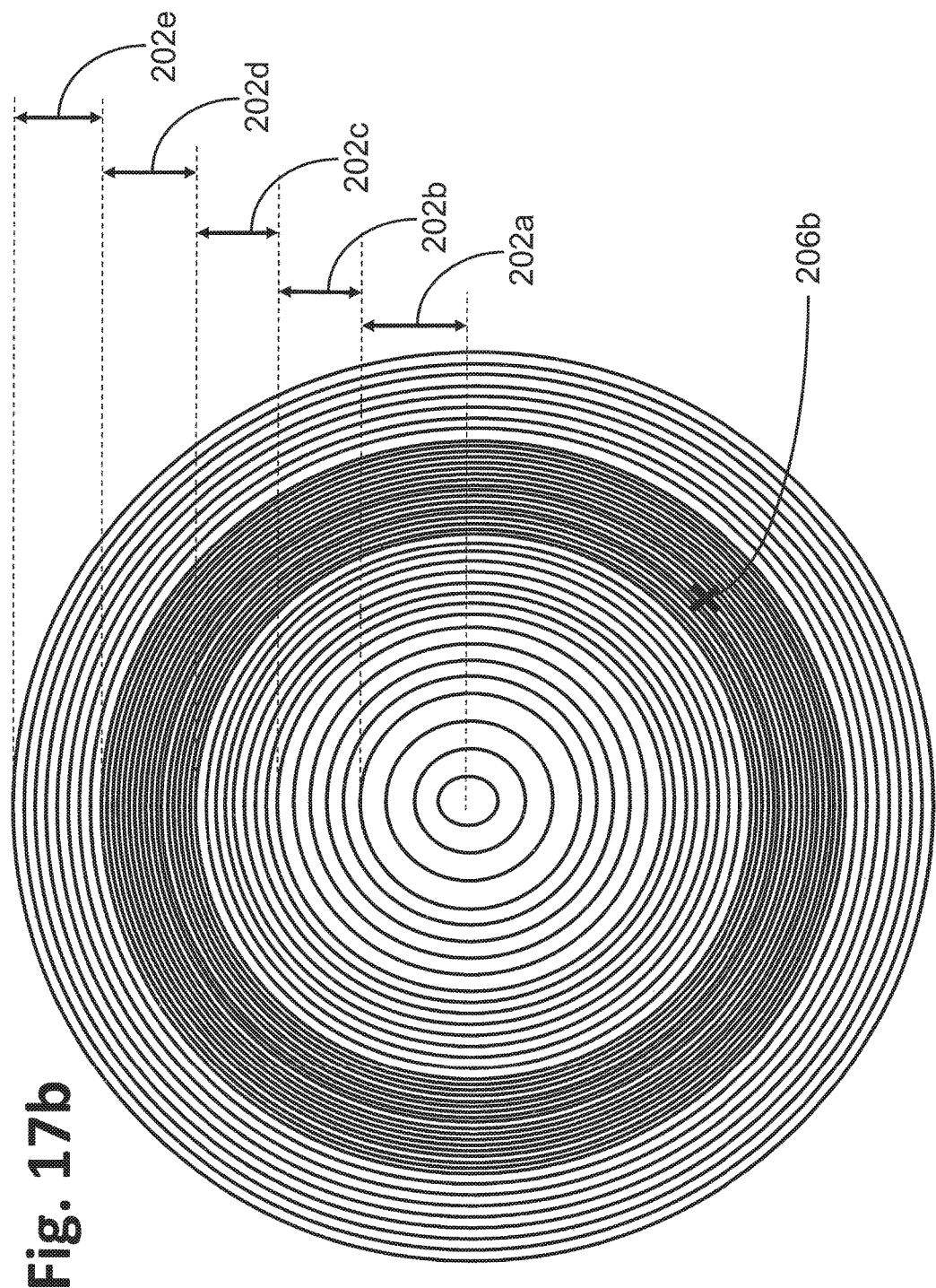
FIG. 17b is a plot of a spiral scan pattern generated with discrete scan line resolution regions by the virtual image generation system of FIG. 2 when the focal point is at the periphery of the scan area.

For example, assuming a spiral scan pattern, an image frame may have five annular discrete regions 204a-204e, as illustrated in FIGS. 17a-17b. If it is presumed that the end user 50 is focused at the center of the field of view indicated by point 206a, the highest resolution region will be, e.g., 204a, and the remaining peripheral regions 204b-204e will have decreasing resolutions (FIG. 17a), starting with 204b, then 204c, then 204d, and finally 204e. In contrast, if it is presumed that the end user 50 is focused at the periphery of the field of view indicated by point 206d, the highest resolution region will be, e.g., 204d (FIG. 17b), and the remaining peripheral regions 204b-204e will have decreasing resolutions, starting with 204c and 204e, then 204b, and finally 204a. Notably, the resolution profile of the discrete regions 204 illustrated in FIGS. 17a and 17b is in accordance with the visual acuity distribution illustrated in FIG. 9b. That is, the resolution of the discrete regions will decrease from the highest resolution discrete region associated with the focal point at the rate that substantially matches the amount that the visual acuity from the center of the profile.

As another example, assuming a raster scan pattern, an image frame may have five rectangular discrete regions 208a-208i, as illustrated in FIGS. 18a-18b. If it is presumed that the end user 50 is focused at the center of the field of view indicated by point 210a, the highest resolution region will be, e.g., 208e, and the remaining peripheral regions 208a-208d and 208f-208i will have decreasing resolutions (FIG. 18a), starting with 208d and 208f, then 208c and 208g, then 208b and 208h, and finally 208a and 208i. In contrast, if it is presumed that the end user 50 is focused at the periphery of the field of view indicated by point 208c, the highest resolution region will be, e.g., 208c (FIG. 18b), and the remaining peripheral regions 204a-204b and 204d-204i will have decreasing resolutions, starting with 204b and 204d, then 204a and 204e, then 204f, then 204g, then 204h, and finally 204i. Again, the resolution profile of the discrete regions 208 illustrated in FIGS. 18a and 18b is in accordance with the visual acuity distribution illustrated in FIG. 9b. That is, the resolution of the discrete regions will decrease from the highest resolution discrete region associated with the focal point at the rate that substantially matches the amount that the visual acuity from the center of the profile.

Figure 19:
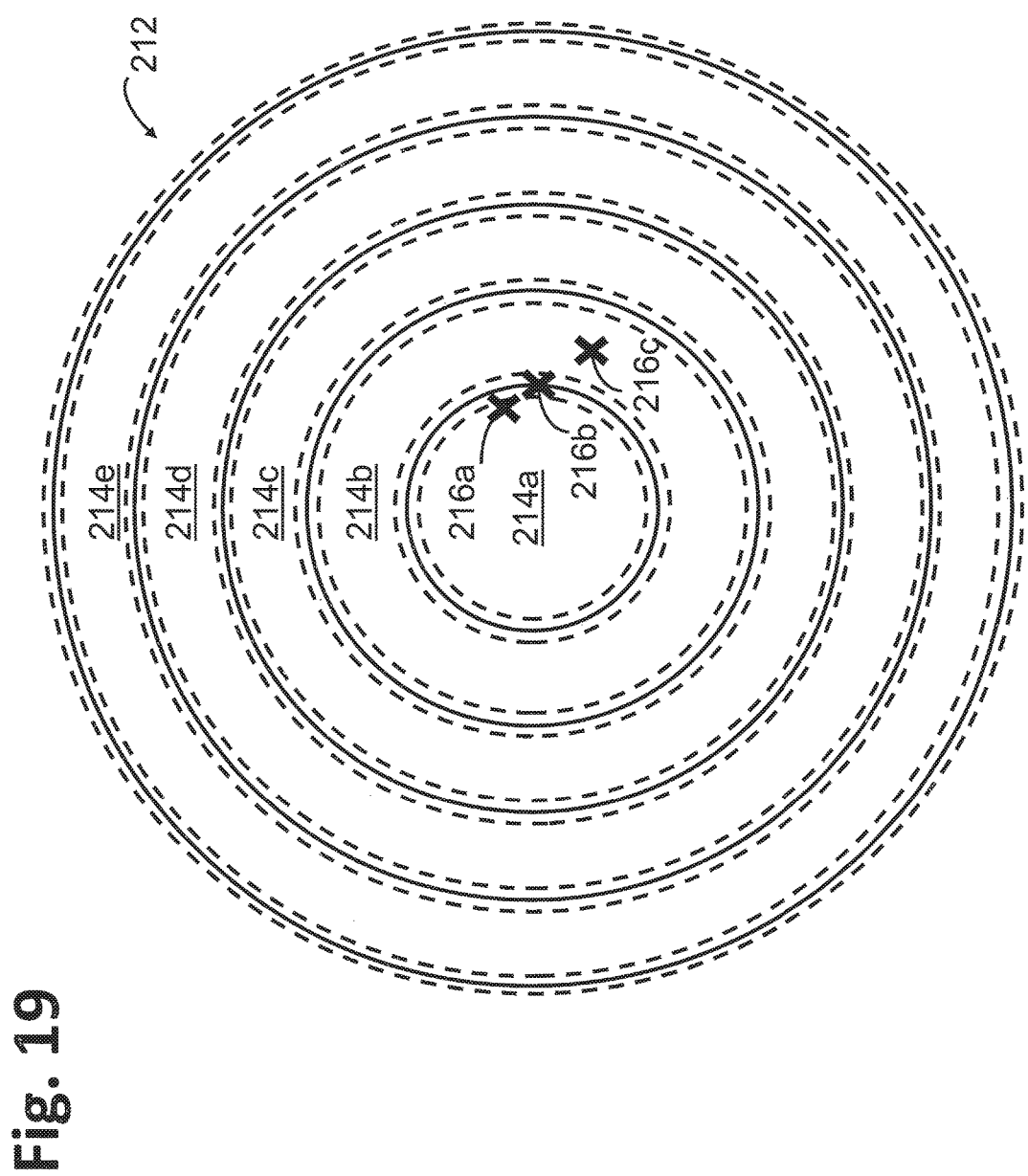
FIG. 19 is a plot of a field of view template having discrete regions from which the virtual image generation system of FIG. 2 can select based on the location of the focal point.

In one embodiment, the discrete region of highest resolution may be selected from a field of view template based on the focal point of the end user. For example, referring to FIG. 19, a field of view template 212 that assumes a spiral scan pattern includes five annular discrete regions 214a-214e. In the illustrated embodiment, each of the discrete regions 214a-214e can be selectively expanded from a nominal size (represented by solid lines) to an expanded size (represented by dashed line), e.g., by 10 percent, in order to take into account the error margin described above.

For example, assuming that the estimated focal point of the end user 50 is near the periphery of the nominal discrete region 214a at point 216a, the expanded discrete region 214a will be selected and displayed as the region with the highest resolution, as illustrated in FIG. 20a. If the actual focal point of the end user 50 is just outside the periphery of the nominal discrete region 214a at point 216b, the focal point 216b will still be included within the highest resolution by virtue of the fact that the expanded discrete region 214a covers the point 216b. As also illustrated in FIG. 20a, the portion of the discrete region 214b not overlapping with the expanded discrete region 212a will be displayed at a decreased resolution. In other words, the portion of the nominal discrete region 214b (defined by the dashed line and the solid line of the discrete region 212a) will be ignored, since this region is already covered by the expanded portion of the high resolution discrete region 214a. The remaining discrete regions 212c-212e will be displayed in their nominal form (unexpanded) with decreasing resolutions.

The expanded discrete region 214a will continue to be displayed with the highest resolution until the estimated focal point of the end user 50 is outside of the nominal discrete region 212a in the field of view template 210. For example, if the estimated focal point of the end user 50 is changed to point 214c in the discrete region 212b of the field of view template 210, the expanded discrete region 212b will be displayed as the discrete region with the highest resolution, as illustrated in FIG. 20b. As also illustrated in FIG. 20b, the portion of the discrete regions 214a and 214c not overlapping with the expanded discrete region 212b will be displayed at decreased resolutions. In other words, the portion of the nominal discrete region 214a (defined by the dashed line and the solid line of the discrete region 212a) and the portion of the discrete region 214c (defined by the dashed line and the solid line of the discrete region 212c) will be ignored, since these regions are already covered by the expanded portions of the high resolution discrete region 214b. The remaining discrete regions 212d-212e will be displayed in their nominal form (unexpanded) with decreasing resolutions.

In an optional embodiment, because the lower resolution regions of the displayed frames may create visual artifacts for the end user 50 (e.g., the end user 50 may be able to distinctly visualize the individual scan lines due to the relatively large spacing between the scan lines), these lower resolution regions may be blurred. The amount of blurring can be commensurate with the amount of resolution degradation in the lower resolution regions of the frame. For example, if the resolution of a low resolution region is four times less (25%) than the resolution of the highest resolution region, a displayed pixel in the low resolution region can be blurred to four times the original size of the pixel. In one embodiment, the lower resolution regions can be blurred by dithering scan lines in adjacent displayed frames. For example, in the case where two fields are interlaced in a frame, in one frame, the scan lines of an even field may be displayed, and in the next frame, the scan lines of the odd field may be displayed. In another embodiment, the lower resolution regions can be blurred by defocusing the displayed frames in the lower resolution region. This can be accomplished by, e.g., displaying the scan lines of the lower resolution regions in a focal plane different from the focal plane of the end user 50.

Figure 21:
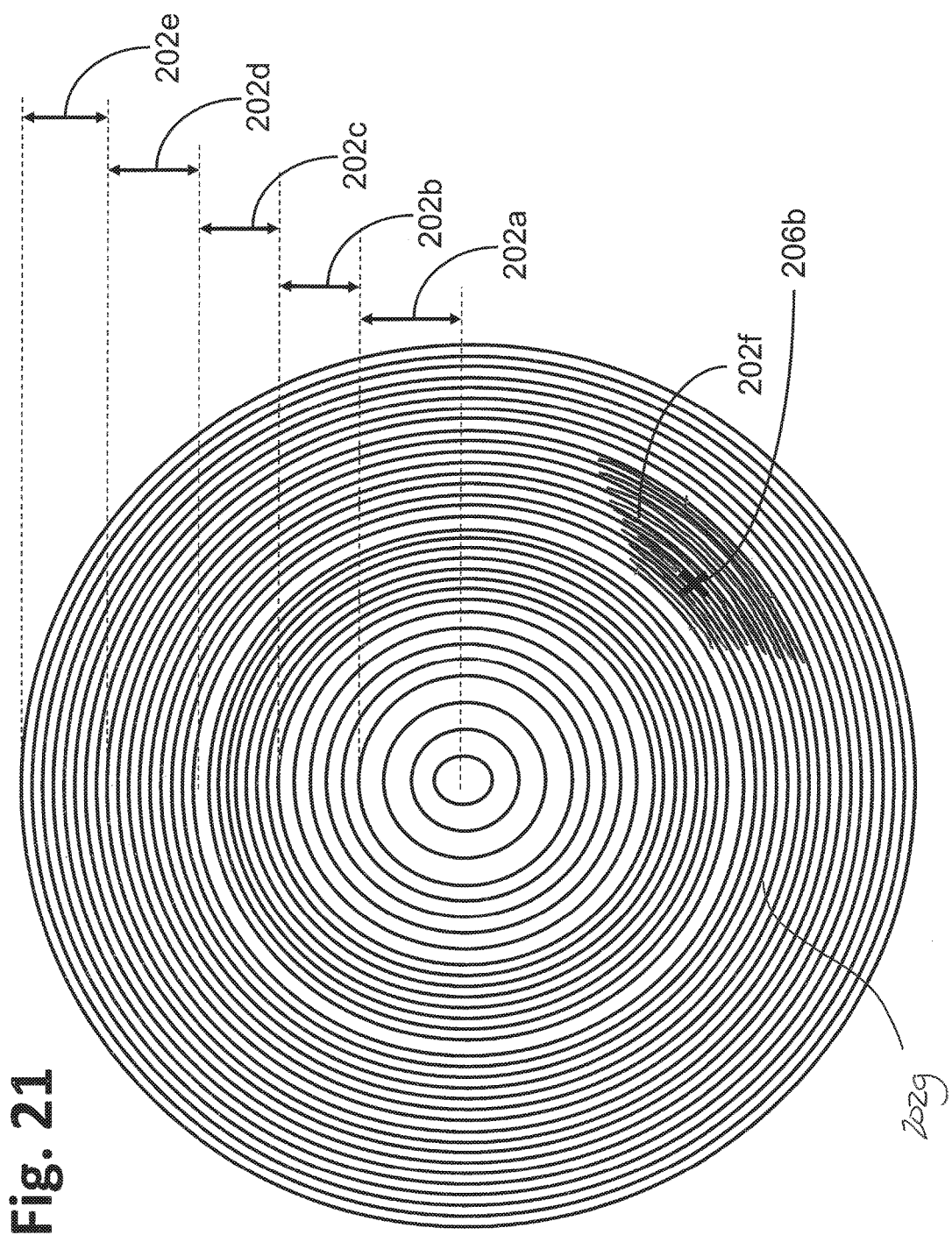
FIG. 21 is a plot of is a spiral scan pattern generated with discrete scan line resolution regions by the virtual image generation system of FIG. 2 when the focal point is at the periphery of the field of view template of FIG. 19, wherein a high resolution region is sector-shaped.
Figure 22:
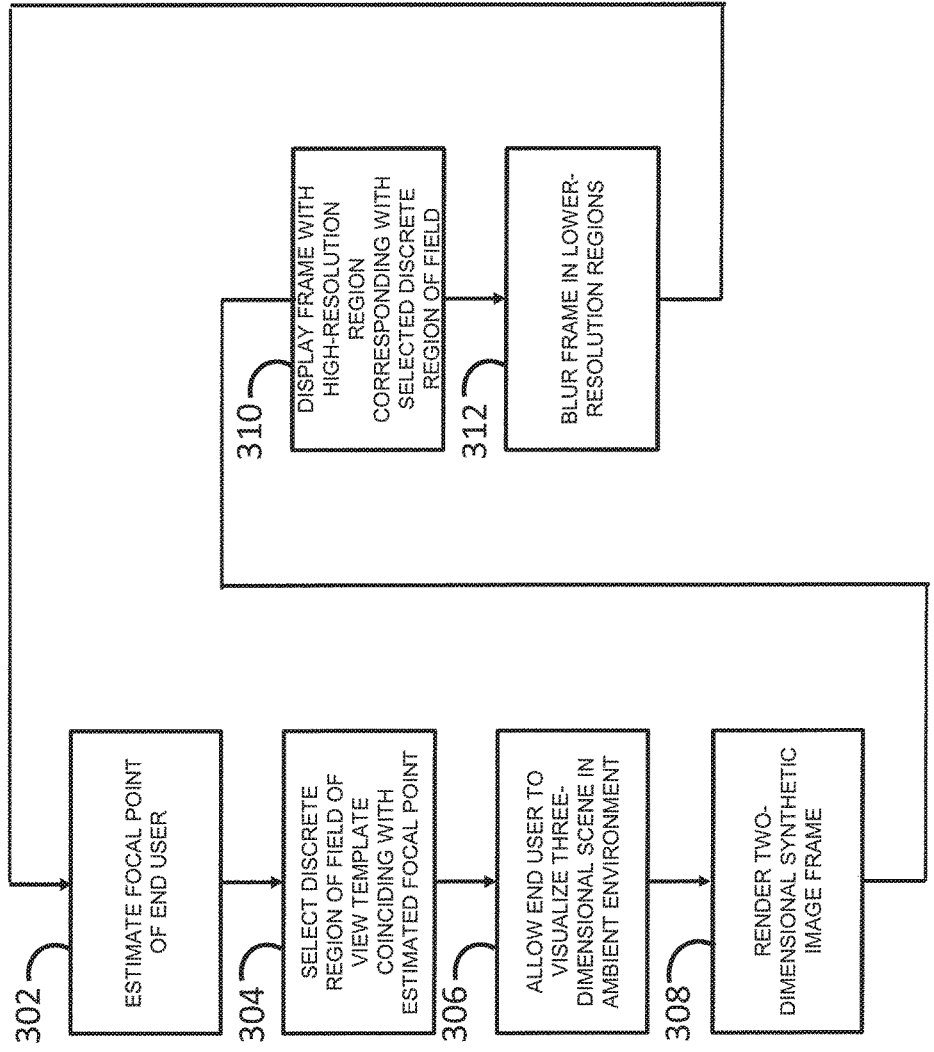
FIG. 22 is a flow diagram of a method of operating the virtual image generation system of FIG. 2 to render and display synthetic image frames with non-uniform density distributions to the end user.

In another optional embodiment, higher resolution regions in the periphery of the frame generated by a spiral scan pattern may create artifacts in the form of visualizing bands of high line density on the periphery of the frame. To minimize these artifacts, a high resolution sector, instead of a high resolution annular, can be scanned. For example, instead of scanning a high resolution annular region 202d as illustrated in FIG. 17b, a high resolution sector region 202f can be scanned to cover the estimated focal point 206b, as illustrated in FIG. 21. In cases where the limits of the scanning device 116 prevent scanning of the remaining sector region 202g of the annular region 202d (i.e., the sector region outside of the high resolution sector region 202f) at a lower resolution, the scanning device 116 can be prevented from displaying all of the scan lines within the desired lower resolution sector region. For example, for a particular 360 degree scan line within the annular region 202d, the scanning device 116 can cease outputting light for the scan line in the low resolution sector and output light for the same scan line in the high resolution sector region 202f. Then, for another adjacent 360 degree scan line within the annular region 202d, the scanning device 116 may maintain output of the light for the scan line over the entire 360 degree range.

Having described the structure and function of the virtual image generation system 100, one method 300 performed by the virtual image generation system 100 to display synthetic image frames to the end user 50 will now be described with respect to FIG. 21.

To this end, the CPU 132 estimates the focal point of the end user 50 (e.g., either by detecting it via the patient orientation detection module 130 or assuming that the focal point is coincident with an identified object of interest in the field of view of the end user 50 (step 302), and selects the discrete region of the field of view template that coincides with the estimated focal point (step 304). The virtual image generation system 100 then allows the end user 50 to visualize the three-dimensional scene in an ambient environment (step 306). This can be accomplished, e.g., in a "video see-through" display, in which the CPU 132 directs the forward facing cameras 128 to capture image data of the three-dimensional scene, and directs the display subsystem 104 to display the captured image data to the end user 50; or an "optical see-through" display, in which the end user is simply allowed to view directly the light from the three-dimensional scene.

The CPU 132 also instructs the GPU 134 to generate virtual image data from the point of the view of the end user 50, and in this embodiment, rendering two-dimensional virtual image data from a three-dimensional virtual scene as a synthetic image frame (step 308). In one embodiment, the frames may be rendered based on predictive head positions in order to minimize any latency issues, e.g., by rendering and warping the virtual image data in the manner described in U.S. Patent Application Ser. No. 62/304,418, entitled "Wide Baseline Stereo for Low-Latency Render", which is expressly incorporated herein by reference.

The CPU 132 then instructs the display subsystem 104 to display the synthetic image frame to the end user 50 that, along with the ambient three-dimensional scene, thereby creating a three-dimensional augmented scene (step 310). In one method, the synthetic image frame is displayed with a non-uniform resolution distribution, and in particular, the synthetic image frame is displayed with a highest-resolution region that corresponds with the selected discrete region from the field of view template. The synthetic image frame may be displayed with discrete regions that gradually decrease in resolution in accordance with their distance from the highest-resolution region. The resolutions of the discrete regions may, e.g., match or even be sharper than the acuity distribution of the human eye. Notably, if the synthetic image frame, as rendered, has a uniform resolution distribution, the CPU 132 will incorporate the non-uniform resolution distribution into the rendered frame by, e.g., instructing the display subsystem 104 to ignore certain pixels in the regions of the frames where low resolution is desired. If, on the other hand, if the synthetic image frame, as rendered, has the non-resolution distribution by virtue of rendering the frame with the high-resolution region corresponding with the selected discrete region of the field of view template, the CPU 132 will display the frame as rendered.

In the illustrated method, the display subsystem 104 scans the synthetic image frame, e.g., in a spiral pattern, such that the non-uniform resolution distribution radially varies, or in a raster pattern, such that the non-uniform resolution distribution varies rectilinearly. The discrete regions may be annular or even sector-shaped in the case of a spiral scan pattern or rectangular in the case of a raster scan pattern. The CPU 132 also instructs the display subsystem 104 to blur the synthetic image frame in the lower resolution regions (e.g., by dithering scan lines or defocusing in the lower resolution region) (step 312). It should be appreciated that although the step of blurring the synthetic image frame in the lower resolution regions is illustrated in the flow diagram as occurring after the rendering and display steps, it should be appreciated that the blurring step can be performed concurrently with the rendering or display steps. The CPU 132 then returns to step 302 to generate and display another synthetic image frame having a non-uniform distribution, which, depending on the newly estimated focal point of the end user 50, may be identical or different from the non-uniform distribution in the previous synthetic image frame.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of operating a virtual image generation system, the method comprising:
   estimating a focal point of an eye within a field of view of the end user;
   rendering a plurality of synthetic image frames of a three-dimensional scene;
   sequentially displaying the plurality of image frames to the end user;
   generating a non-uniform resolution distribution for each of the displayed image frames in response to the estimated focal point, the non-uniform resolution distribution having a region of highest resolution and a region of lower resolution, wherein the region of highest resolution is coincident with the estimated focal point, and wherein the estimated focal point of the end user has an error margin to provide a focal range within the field of the view of the end user, and the region of highest resolution intersects the focal range;
   blurring the displayed image frames in the region of lower resolution; and
   dynamically modifying the error margin based on an assumed eye angular velocity profile.

2. The method of claim 1, wherein each of the image frames is rendered with the non-uniform resolution distribution.

3. The method of claim 1, wherein each of the image frames is rendered having a uniform resolution distribution, and wherein displaying the respective image frame comprises incorporating the non-uniform resolution distribution into the already rendered image frame.

4. The method of claim 1, wherein the region of highest resolution and a region of lower resolution are discrete.

5. The method of claim 4, further comprising selecting the region of highest resolution from a field of view template having a plurality of discrete regions.

6. The method of claim 5, wherein the plurality of discrete regions in the field of view template overlap each other.

7. The method of claim 5, wherein each of the image frames is scanned in a spiral pattern, and wherein each of the discrete regions is sector-shaped.

8. The method of claim 1, wherein each of the displayed image frames is scanned, and blurring the displayed image frames comprises dithering scan lines in adjacent displayed image frames in the region of lower resolution.

9. The method of claim 1, wherein blurring the displayed image frames comprises defocusing the displayed image frames in the region of lower resolution.

10. The method of claim 1, wherein each of the displayed image frames is scanned, and the blurring of the image frames in the region of lower resolution minimizes visual artifacts due to relatively large spacing between scan lines in the region of lower resolution.

11. The method of claim 1, wherein a resolution distribution of each of the displayed image frames has a slope that matches the slope of an acuity distribution of an eye of the end user.

12. The method of claim 1, wherein a resolution distribution of each of the displayed image frames has a slope that is greater than the slope of an acuity distribution of an eye of the end user.

13. A virtual image generation system for use by an end user, comprising:
   memory storing a three-dimensional scene;
   a control subsystem configured for
      rendering a plurality of synthetic image frames of the three-dimensional scene,
      estimating a focal point of an eye within a field of view of the end user, and generating a non-uniform resolution distribution for each of the displayed image frames based on the estimated focal point, the non-uniform resolution distribution having a region of highest resolution and a region of lower resolution, wherein the region of highest resolution is coincident with the estimated focal point, and wherein the estimated focal point of the end user has an error margin to provide a focal range within the field of the view of the end user, and the region of highest resolution intersects the focal range,
      blurring the displayed image frames in the region of lower resolution, and
      dynamically modifying the error margin based on an assumed eye angular velocity profile; and
   a display subsystem configured for sequentially displaying the plurality of image frames to the end user, wherein each of the displayed image frames has a non-uniform resolution distribution.

14. The virtual image generation system of claim 13, wherein the display subsystem includes a projection subsystem and a partially transparent display surface, the projection subsystem configured for projecting the image frames onto the partially transparent display surface, and the partially transparent display surface is configured for being positioned in the field of view between the eyes of the end user and an ambient environment.

15. The virtual image generation system of claim 13, wherein the control subsystem is configured for rendering each of the image frames with the non-uniform resolution distribution.

16. The virtual image generation system of claim 13, wherein the control subsystem is configured for rendering each of the image frames with a uniform resolution distribution, and wherein the display subsystem is configured for displaying the respective image frame by incorporating the non-uniform resolution distribution into the already rendered image frame.

17. The virtual image generation system of claim 13, wherein the region of highest resolution and a region of lower resolution are discrete.

18. The virtual image generation system of claim 17, wherein the control subsystem is configured for selecting the region of highest resolution from a field of view template having a plurality of discrete regions.

19. The virtual image generation system of claim 13, further comprising one or more sensors configured for detecting the focal point of the end user, wherein the control subsystem is configured for estimating the focal point from the detected focal point.

* * * * *